US012752431B2

(12) United States Patent
Lee et al.

(10) Patent No.: US 12,752,431 B2
(45) Date of Patent: Oct. 6, 2026

(54) MOVING ROBOT FOR MONITORING A SHELF, A METHOD FOR MONITORING A SHELF, AND A SYSTEM FOR MONITORING A SHELF

(71) Applicant: SOLUM CO., LTD., Yongin-si (KR)

(72) Inventors: Chang Woo Lee, Yongin-si (KR); Woon Sim Lee, Yongin-si (KR)

(73) Assignee: SOLUM CO., LTD., Yonigin-si (KR)

( * ) Notice: Subject to any disclaimer, the term of this patent is extended or adjusted under 35 U.S.C. 154(b) by 233 days.

(21) Appl. No.: 18/630,663

(22) Filed: Apr. 9, 2024

(65) Prior Publication Data

US 2025/0312921 A1 Oct. 9, 2025

(30) Foreign Application Priority Data

Apr. 8, 2024 (KR) ........................ 10-2024-0047428

(51) Int. Cl.
*B25J 9/16* (2006.01)
*G06Q 10/087* (2023.01)
(Continued)

(52) U.S. Cl.
CPC .......... *B25J 9/1697* (2013.01); *G06Q 10/087* (2013.01); *G06V 10/751* (2022.01); *G06V 20/52* (2022.01)

(58) Field of Classification Search
CPC . B25J 9/1697; B25J 11/008; B25J 5/00; B25J 9/1679; B25J 13/006; B25J 13/08;
(Continued)

(56) References Cited

U.S. PATENT DOCUMENTS 7,693,757 B2 4/2010 Zimmerman
10,007,964 B1 * 6/2018 Calhoon ................ H04N 7/185
(Continued)

FOREIGN PATENT DOCUMENTS

JP 2019517077 A 6/2019
JP 6744430 B2 8/2020
(Continued)

OTHER PUBLICATIONS

Office Action issued by the Korean Intellectual Property Office (KIPO) concerning application No. KR10-2024-0047428, Jun. 12, 2024.

(Continued)

*Primary Examiner* — Florian M Zeender
*Assistant Examiner* — Kimberly S. Bursum
(74) *Attorney, Agent, or Firm* — STIP Law Group, LLC

(57) ABSTRACT

In a shelf monitoring moving robot moving within a store in which a plurality of shelves are disposed and monitoring products arranged on the plurality of shelves and electronic shelf labels, one embodiment of the present disclosure provides a shelf monitoring moving robot comprising a body, a driving module providing power for movement of the body, an imaging device provided on the body to take images of the plurality of shelves disposed within the store, an electronic shelf label identification device provided on the body to obtain identification information of electronic shelf labels provided on the plurality of shelves, and a controller controlling the operation of the driving module, the imaging device, and the electronic shelf label identification device and generating realogram data including display status of products provided on the plurality of shelves based on images of the plurality of shelves captured by the imaging device.

17 Claims, 19 Drawing Sheets

(51) Int. Cl.
*G06V 10/75* (2022.01)
*G06V 20/52* (2022.01)

(58) Field of Classification Search
CPC ..... B25J 19/02; G06Q 10/087; G06V 10/751; G06V 20/52; G05D 1/43; G06T 7/55; G06T 2207/20212
See application file for complete search history.

(56) References Cited

U.S. PATENT DOCUMENTS

| | | | | |
|---|---|---|---|---|
| 10,399,230 | B2 | 9/2019 | Shah et al. | |
| 10,565,548 | B2 | 2/2020 | Skaff et al. | |
| 10,625,426 | B2 | 4/2020 | Bogolea et al. | |
| 11,087,272 | B2 | 8/2021 | Skaff et al. | |
| 11,130,239 | B2 | 9/2021 | Shah et al. | |
| 2018/0001481 | A1 | 1/2018 | Shah et al. | |
| 2018/0005035 | A1 | 1/2018 | Bogolea et al. | |
| 2019/0215424 | A1* | 7/2019 | Adato | G07G 1/0036 |
| 2019/0337158 | A1 | 11/2019 | Shah et al. | |
| 2020/0215698 | A1 | 7/2020 | Bogolea et al. | |
| 2021/0379765 | A1 | 12/2021 | Shah et al. | |
| 2022/0303445 | A1* | 9/2022 | Skaff | H04N 23/57 |
| 2023/0131517 | A1 | 4/2023 | Bogolea et al. | |

FOREIGN PATENT DOCUMENTS

| | | | |
|---|---|---|---|
| KR | 20210016464 | A | 2/2021 |
| KR | 102282237 | B1 | 7/2021 |

OTHER PUBLICATIONS

Notice of Decision to Grant a Patent issued by the Korean Intellectual Property Office (KIPO) concerning application No. KR10-2024-0047428, Aug. 21, 2024.

* cited by examiner

S209

MOVING ROBOT FOR MONITORING A SHELF, A METHOD FOR MONITORING A SHELF, AND A SYSTEM FOR MONITORING A SHELF

CROSS-REFERENCE TO RELATED APPLICATIONS

This Application claims the benefit of Koran Patent Application No. 10-2024-0047428, filed on Apr. 8, 2024, in the Korean Intellectual Property Office, the entire disclosure of which is incorporated herein by reference for all purposes.

ACKNOWLEDGEMENT

The present patent application has been filed as a research project as described below.

National Research and Development Project Supporting the Present Invention

[Project Unique ID] 1415188782
[Project Number] P0024369
[Department] Ministry of Trade, Industry and Energy
[Project Management (Specialized) Agency] Korea Institute for Advancement of Technology
[Research Program Name] World Class Plus Project Support
[Research Project Name] Development of a Cloud-Based Future Retail Integrated Solution Using Deep Learning Algorithms
[Project Performing Institute] SOLUM Co., Ltd.
[Research Period] 2023 Apr. 1~2026 Dec. 31

BACKGROUND OF THE INVENTION

Technical Field

The present disclosure relates to a moving robot for monitoring a shelf, a system for monitoring a shelf, and a method for monitoring a shelf More specifically, the present disclosure relates to a shelf monitoring moving robot, a shelf monitoring system, and a shelf monitoring method capable of generating realograms of a first shelf with improved accuracy by utilizing position information of electronic shelf labels provided on a second shelf facing the first shelf in generating realograms including the display status of products provided on the first shelf.

Related Art

The use of electronic labels is gradually spreading across various application fields, particularly for displaying product information of products displayed in stores. Also known as electronic shelf labels or electronic tags, the electronic labels are connected to a server through a gateway to receive product information to be displayed and display the received product information on an electronic paper display. The electronic paper display is widely used for its low power consumption, which ensures prolonged battery life; also, display information on the electronic paper display may be changed through a communication network, which helps reduce labor costs for store management.

When a new product is displayed on the shelf, an assignment procedure is required so that the product's information is displayed on the electronic label. Typically, when a store manager scans the barcode attached to the electronic label with a terminal, scans the product barcode, and transmits the scanned data to the server, the server assigns the electronic label to the corresponding product, registers the association in the database, and transmits the product information of the product to the electronic label to change the display thereon.

In this manner, a plurality of products newly displayed on a shelf and a plurality of electronic labels assigned with information of the corresponding products may be paired and placed on the shelf. Each of the plurality of electronic labels may include unique identification information, and the identification information may include position information of the electronic label. Realograms including the display status of a plurality of products provided on the shelf may be formed based on the position information of the electronic labels based on the identification information of the electronic labels and the product information assigned to the electronic labels.

The realogram serves as a real-time product display diagram that shows a user the status of products displayed across multiple shelves disposed within a store and may be used by the user to manage the store.

For example, users may manage the display status of products in a store by identifying which products are placed on which shelves and at which positions and determine the status of popular items by assessing the current product quantities.

However, generating a realogram may pose challenges for a user since the user may have to manually determine the current arrangement of the products assigned to electronic labels and assign the information to the corresponding electronic label individually; as a result, the user may have difficulty in operating the store efficiently.

There is a need for research on a shelf monitoring method that may improve the user efficiency of store management by monitoring products and electronic labels on the shelf to efficiently generate realograms and provide the generated realograms to the user.

SUMMARY OF THE INVENTION

According to various embodiments of the present disclosure, a shelf monitoring moving robot, a shelf monitoring system, and a shelf monitoring method capable of systematically obtaining realograms that include the display status of products displayed on the shelf and electronic shelf labels are provided.

According to various embodiments of the present disclosure, in generating realograms for one of the shelves facing each other, a shelf monitoring moving robot, a shelf monitoring system, and a shelf monitoring method capable of improving the accuracy of the realograms for the one of the shelves by utilizing identification information of a plurality of electronic shelf labels provided on the other shelf are provided.

Technical objects to be achieved according to various embodiments of the present disclosure are not limited to the technical objects described above, and other technical objects may also be addressed.

One embodiment of the present disclosure provides a shelf monitoring moving robot moving within a store in which a plurality of shelves are disposed and monitoring products and electronic shelf labels arranged on the plurality of shelves comprising a body, a driving module providing power for movement of the body, an imaging device provided on the body to take images of the plurality of shelves disposed within the store, an electronic shelf label identification device provided on the body to obtain identification information of the electronic shelf labels provided on the plurality of shelves, and a controller controlling the operation of the driving module, the imaging device, and the electronic shelf label identification device and generating realogram data including display status of products provided on the plurality of shelves based on images of the plurality of shelves captured by the imaging device.

According to another aspect, the controller may be configured to control the driving module to move the body between the first shelf and the second shelf facing each other among the plurality of shelves to a first position closer to the second shelf than to the first shelf, control the imaging device to capture a first image of the first shelf at the first position, and obtain information about the first position.

According to another aspect, the controller may be further configured to control the driving module to move the body from the first position to a second position separated by a predetermined distance in a direction parallel to the longitudinal direction of the second shelf, control the imaging device to obtain a second image of the first shelf at the second position, and obtain information about the second position.

According to another aspect, the controller may be further configured to match the first image to information about the first position and match the second image to information about the second position.

According to another aspect, in obtaining information about the first position and information about the second position, the controller may be configured to obtain the information about the first position and the information about the second position by performing wireless communication with an external electronic device.

According to another aspect, in obtaining the information about the first position, the controller may be configured to control the electronic shelf label identification device to obtain, at the first position, identification information of a first electronic shelf label adjacent to the first position among a plurality of electronic shelf labels provided on the second shelf and obtain, as the information about the first position, position information of the first electronic shelf label based on the identification information of the first electronic shelf label.

According to another aspect, in obtaining the information about the second position, the controller may be configured to control the electronic shelf label identification device to obtain, at the second position, identification information of a second electronic shelf label adjacent to the second position among a plurality of electronic shelf labels provided on the second shelf and obtain, as the information about the second position, position information of the second electronic shelf label based on the identification information of the second electronic shelf label.

According to another aspect, the controller may be configured to stitch the first image and the second image adjacent to each other to generate realogram data including the display status of products displayed on the first shelf based on data generated by matching the first image with the information about the first position and matching the second image with the information about the second position.

According to another aspect, when stitching the first image with the second image, the controller may be configured to extract an overlapping area between the first image and the second image using a feature extraction algorithm and stitch the first image with the second image so that the overlapping area is not repeatedly accounted for.

According to another aspect, the shelf monitoring moving robot may further include a distance sensor provided on the body to measure the distance from the body to the second shelf.

According to another aspect, in controlling the driving module to move the body to the first position, the controller may be configured to control the driving module to move the body to a position within a predetermined threshold distance from the second shelf based on the distance information from the body to the second shelf measured by the distance sensor.

According to another aspect, the shelf monitoring moving robot may further include a distance sensor provided on the body to measure the distance from the body to the first shelf.

According to another aspect, in controlling the driving module to move the body to the second position from the first position, the controller may be configured to determine the predetermined distance between the first position and the second position based on the field-of-view information of the imaging device and the distance information from the body to the first shelf measured by the distance sensor.

According to another aspect, the electronic shelf label identification device may include a wireless communication module that obtains data of identification information of the electronic shelf label through wireless communication with the electronic shelf label provided on the second shelf.

According to another aspect, the electronic shelf label identification device may include an additional imaging device that takes an image of one of the electronic shelf labels provided on the second shelf.

According to another aspect, the controller may be configured to identify the pattern code displayed on one of the electronic shelf labels from the image captured by the additional imaging device and obtain data of the identification information of one of the electronic shelf labels assigned to the identified pattern code.

According to another aspect, the controller may be configured to control the driving module to move the body between the first shelf and the second shelf facing each other among the plurality of shelves to a first position closer to a second shelf than to the first shelf, control the imaging device to capture a first image of the first shelf at the first position, control the electronic shelf identification device to obtain, at the first position, identification information of a first electronic shelf label adjacent to the first position among a plurality of electronic shelf labels provided on the second shelf, control the driving module to move the body between the first shelf and the second shelf to a second position closer to the first shelf than to the second shelf, control the imaging device to capture a second image of the second shelf at the second position, and control the electronic shelf identification device to obtain, at the second position, identification information of a second electronic shelf label adjacent to the second position among a plurality of electronic shelf labels provided on the first shelf.

According to another aspect, the controller may be configured to generate first realogram data including display status of products provided on the first shelf based on the first image and generate second realogram data including display status of products provided on the second shelf based on the second image.

According to another aspect, in generating the first realogram data, the controller may be configured to include product-related information assigned to the second electronic shelf label corresponding to the identification information of the second electronic shelf label obtained by the electronic shelf label identification device in the first realogram data and include product-related information assigned to the first electronic shelf label corresponding to the identification information of the first electronic shelf label obtained by the electronic shelf label identification device in the second realogram data.

According to another aspect, the controller may be further configured to control the driving module to move the body to position 1-1 closer to a second shelf than to the first shelf, control the imaging device to obtain, at the position 1-1, a first target image of the first electronic shelf label, which is one of a plurality of electronic shelf labels provided on the second shelf, control the driving module to move the body to position 1-2 closer to the second shelf than the position 1-1 and adjacent to the first electronic shelf label, control the imaging device to capture the first image of the first shelf at the position 1-2, and control the electronic shelf label identification device to obtain identification information of the first electronic shelf label at the position 1-2.

According to another aspect, while generating realogram data including display status of products provided on the second shelf based on the second image, the controller may be configured to specify the first electronic shelf label from the second image by comparing the second image with a first target image of the first electronic shelf label provided on the second shelf, specify a product adjacent to the first electronic shelf label from the second image, and match product-related information assigned to the first electronic shelf label extracted based on the identification information of the first electronic shelf label to a product adjacent to the first electronic shelf label specified in the second image.

One embodiment of the present disclosure provides a shelf monitoring system comprising a shelf monitoring moving robot moving within a store in which a plurality of shelves are disposed and monitoring products and electronic shelf labels provided on the plurality of shelves; and a server including at least one processor performing computations for controlling the operation of the shelf monitoring moving robot and a memory storing commands and programs for controlling the operation of the shelf monitoring moving robot.

According to another aspect, the at least one processor may be configured to control the shelf monitoring moving robot between the first shelf and the second shelf facing each other among the plurality of shelves to sequentially move through a plurality of positions closer to the second shelf than to the first shelf, control the imaging device of the shelf monitoring moving robot to obtain a plurality of images by taking images of the first shelf sequentially at each of the plurality of positions, obtain information about the plurality of positions, and match an image of the first shelf obtained at any one position of the plurality of positions to information about the any one position and store the matched information in the memory.

One embodiment of the present disclosure provides a shelf monitoring method for a shelf monitoring moving robot to move within a store in which a plurality of shelves are disposed and monitor products and electronic shelf labels provided on the plurality of shelves, the method comprising moving sequentially between the first and second shelves included in the plurality of shelves and facing each other through a plurality of positions closer to the second shelf than to the first shelf by the shelf monitoring moving robot, taking images of the first shelf sequentially at each of the plurality of positions by the shelf monitoring moving robot, obtaining information about the plurality of positions, and matching an image of the first shelf obtained at any one position among the plurality of positions to information about the any one position.

According to various embodiments of the present disclosure, a shelf monitoring moving robot, a shelf monitoring system, and a shelf monitoring method may be provided, which are capable of obtaining in real-time realograms including the display status of products displayed on the shelf and electronic shelf labels based on the images obtained by a moving robot moving around within a store and take images of the shelf.

According to various embodiments of the present disclosure, in generating realograms for one of the shelves facing each other, a shelf monitoring moving robot, a shelf monitoring system, and a shelf monitoring method may be provided, which are capable of improving the accuracy of the realograms for the one of the shelves by utilizing images of the one shelf captured by an imaging device provided on one side of a moving robot and the identification information of a plurality of electronic shelf labels provided on the other shelf obtained by an electronic shelf label identification device provided in the other side of the moving robot.

The technical effects of the present disclosure are not limited to the technical effects described above, and other technical effects not mentioned herein may be understood clearly from the description below.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the disclosure, the same or corresponding constituting element is assigned the same reference number, and repeated descriptions thereof will be omitted.

Figure 1:
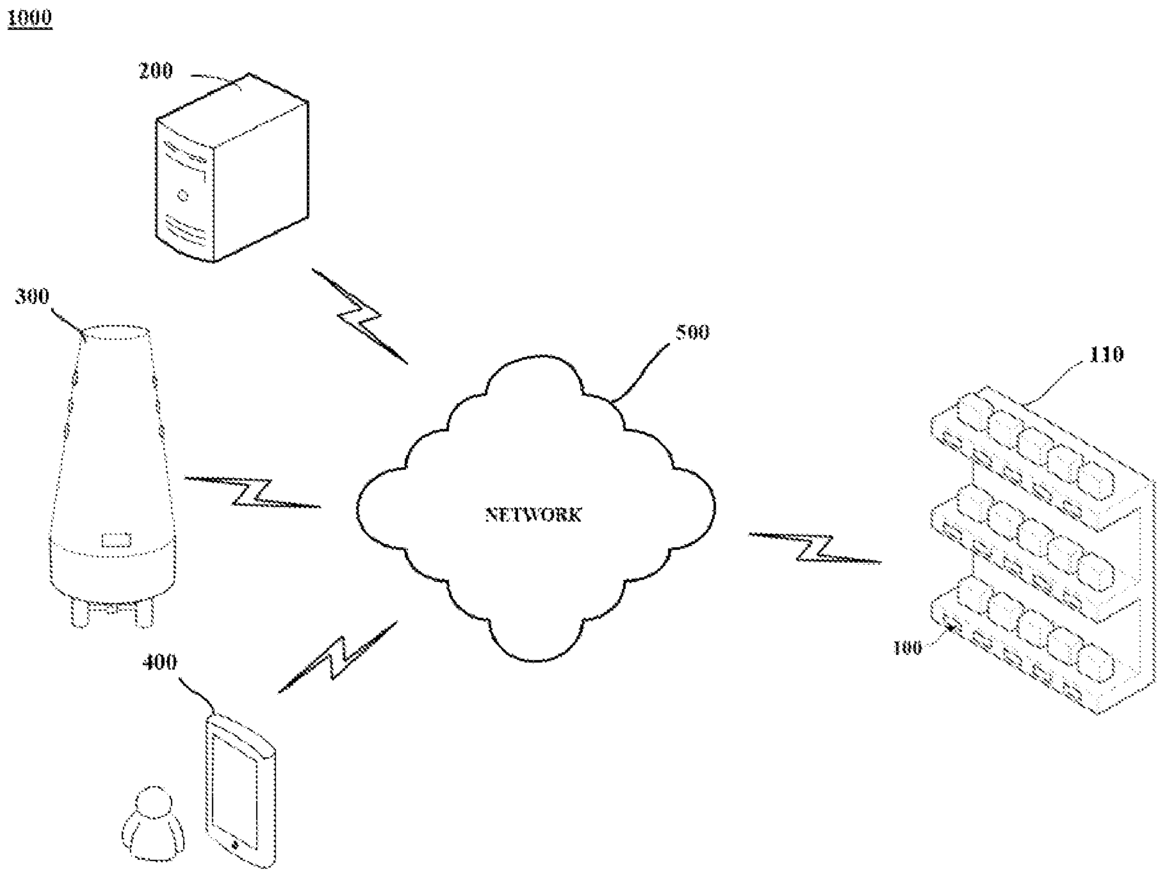
FIG. 1 illustrates an exemplary structure of a shelf monitoring system according to one embodiment.
Figure 2:
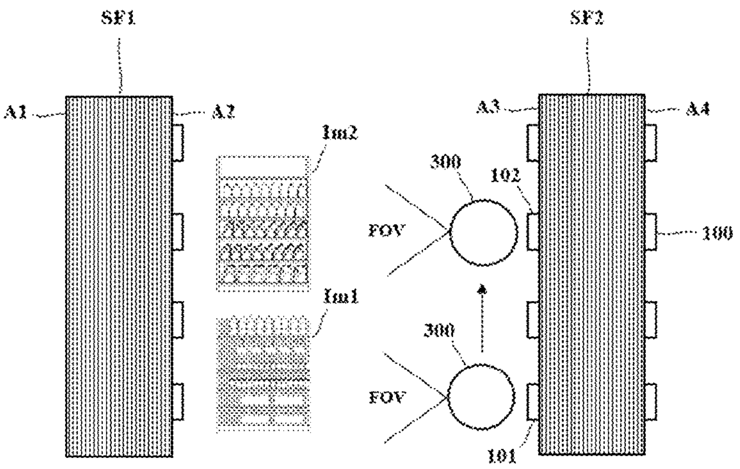
FIGS. 2 and 3 illustrate a process of generating realograms while a shelf monitoring moving robot according to one embodiment moves within a store.
Figure 3:
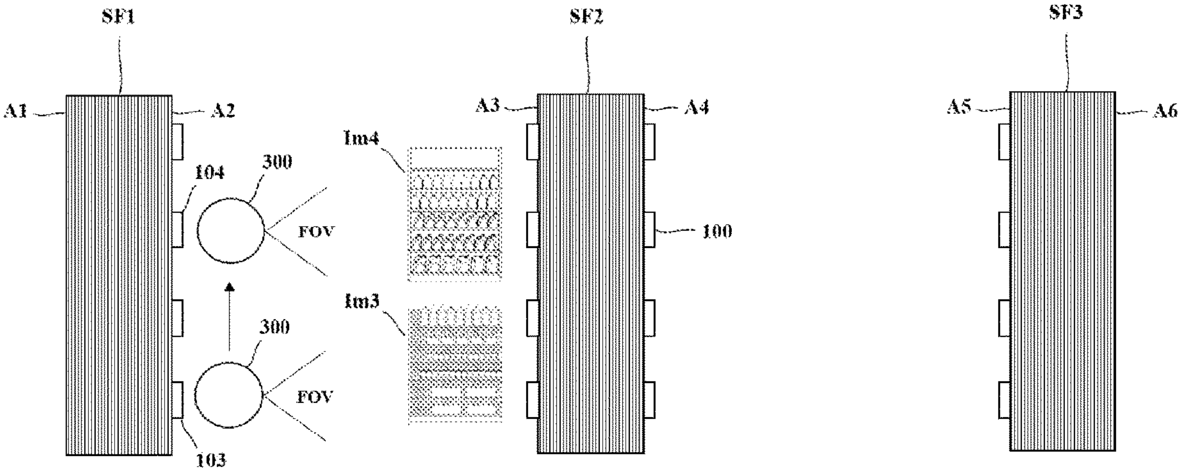
Figure 4:
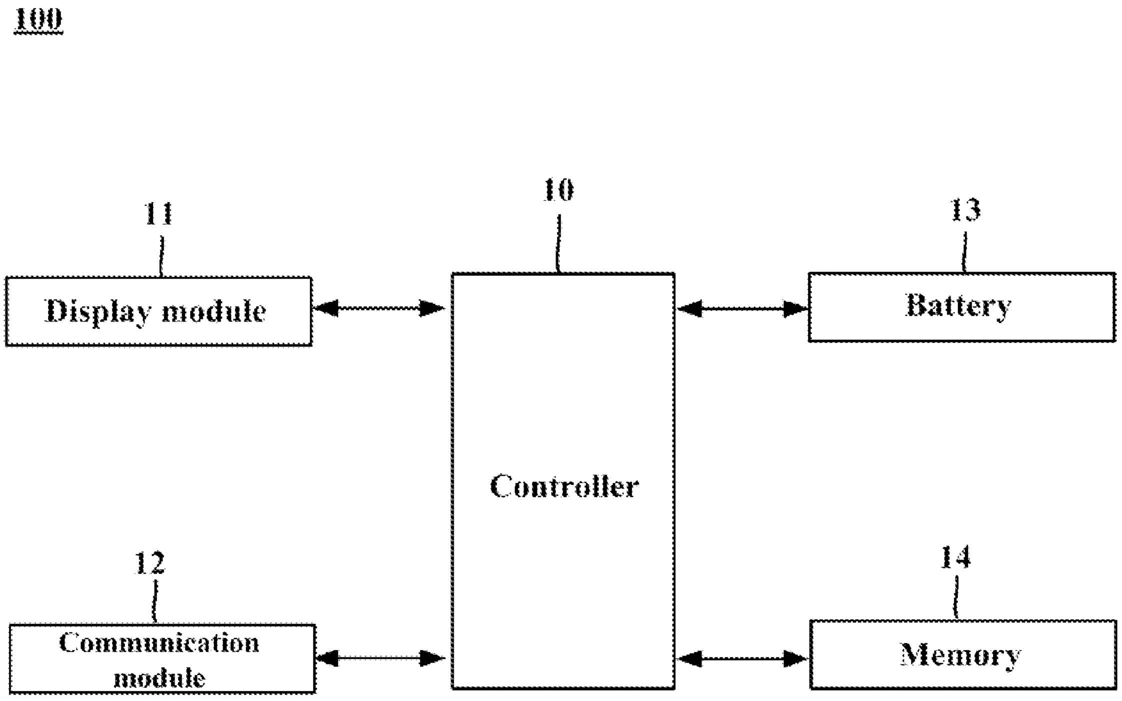
FIG. 4 is a block diagram illustrating an exemplary structure of an electronic shelf label according to one embodiment.
Figure 5:
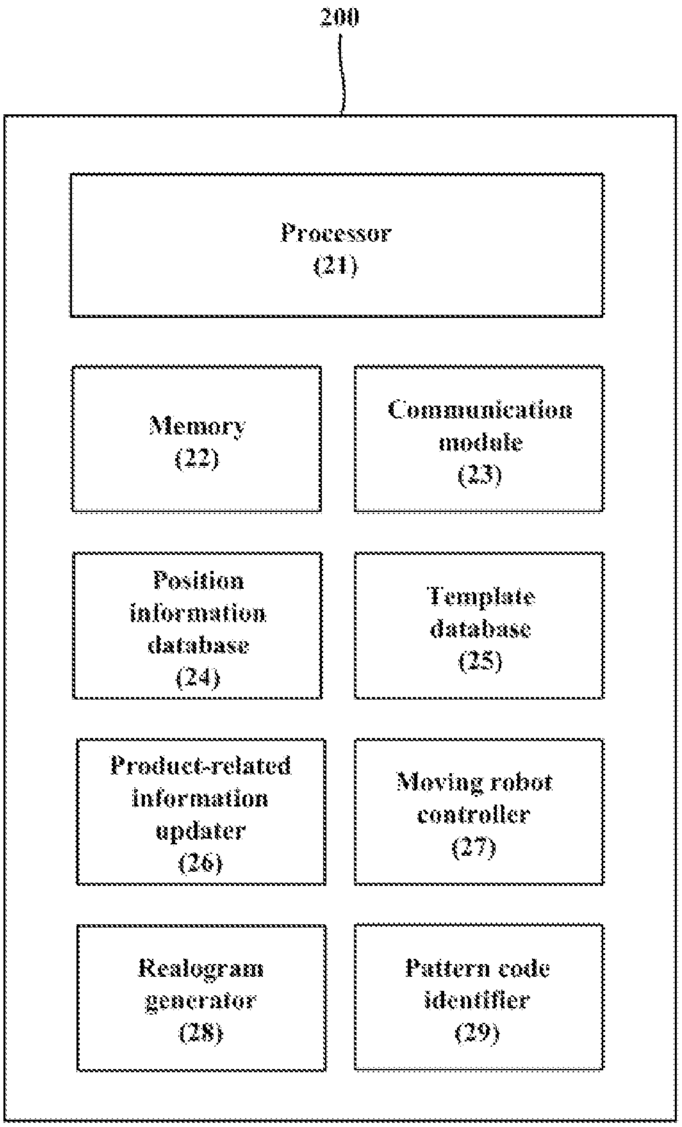
FIG. 5 is a block diagram illustrating an exemplary structure of a server according to one embodiment.
Figure 6:
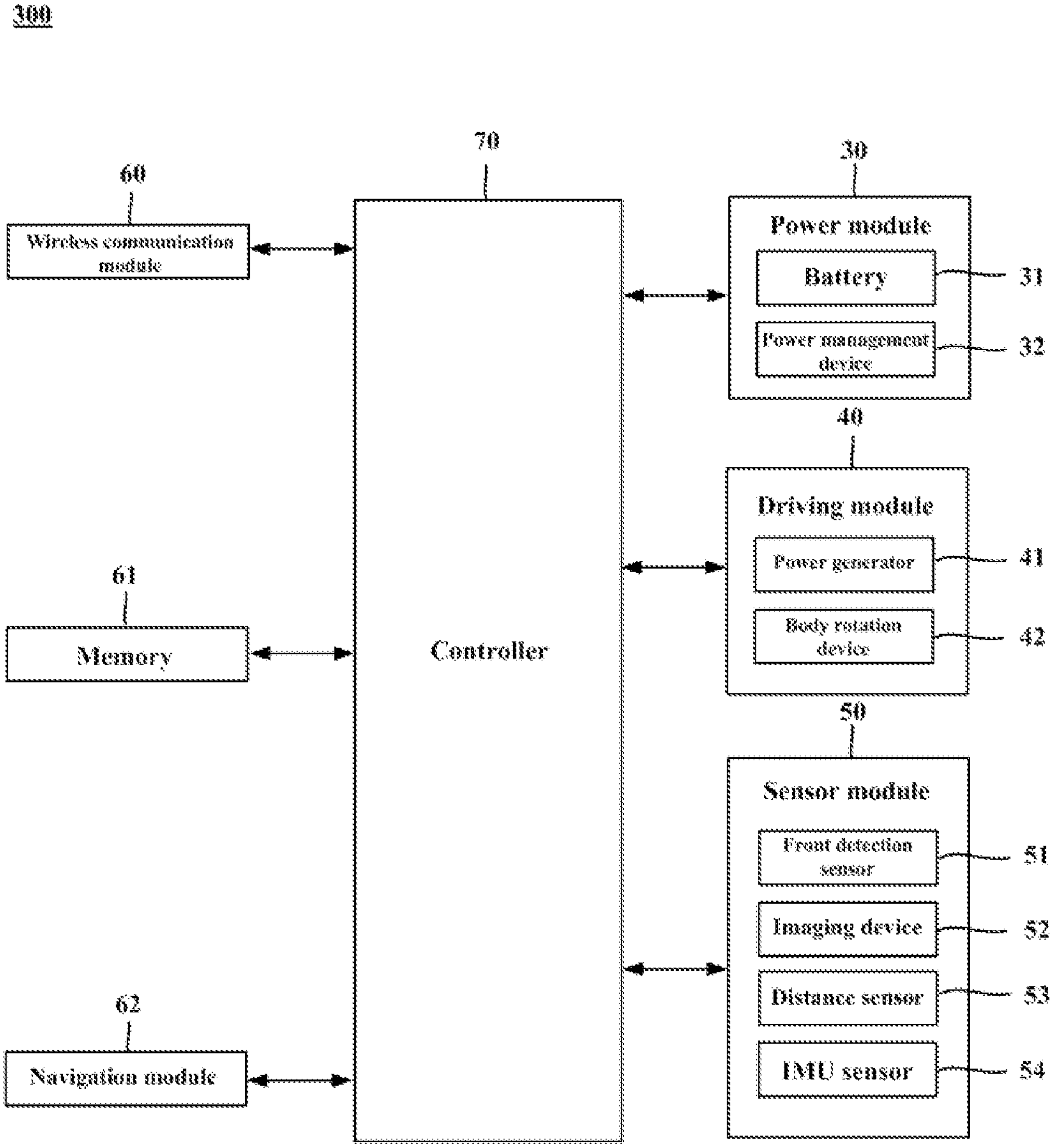
FIG. 6 is a block diagram illustrating an exemplary structure of a shelf monitoring moving robot according to one embodiment.
Figure 7:
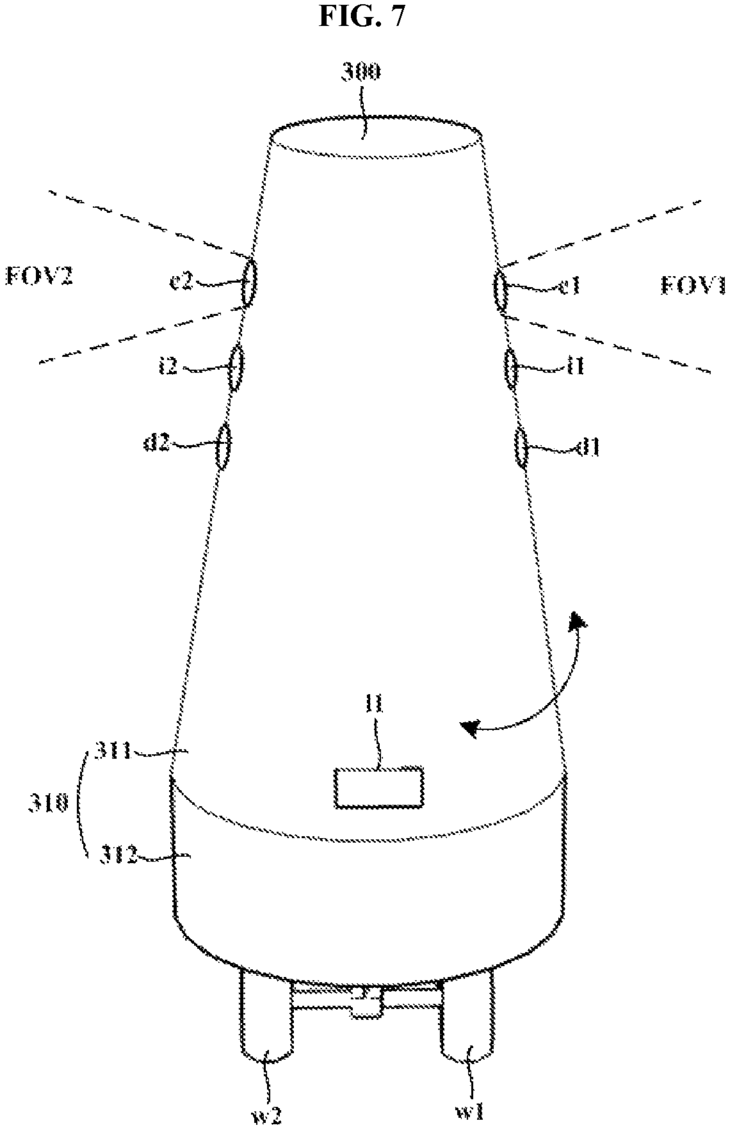
FIG. 7 illustrates an exemplary structure of a shelf monitoring moving robot according to one embodiment.
Figure 8:
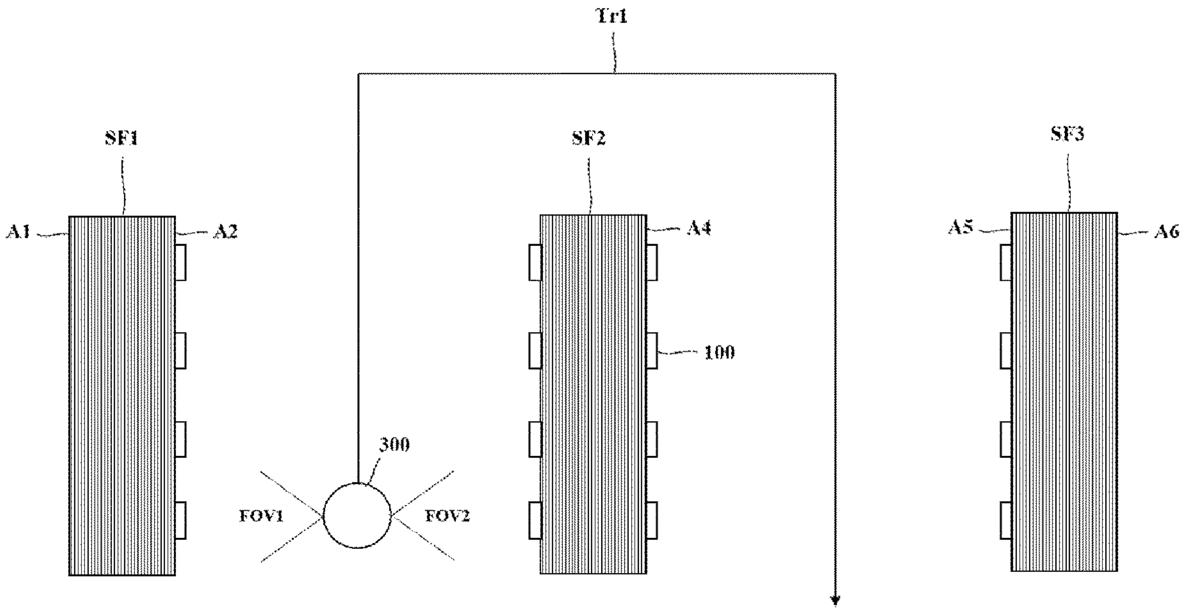
FIGS. 8, 9 and 10 illustrate a process of monitoring the inside of a store by a shelf monitoring moving robot according to one embodiment.
Figure 9:
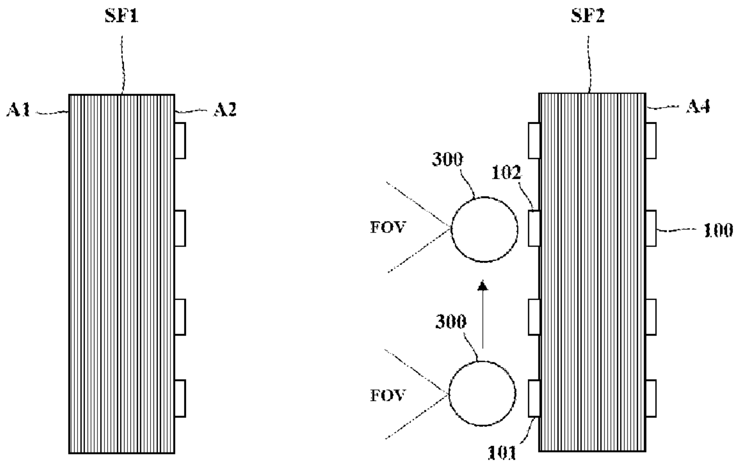
Figure 10:
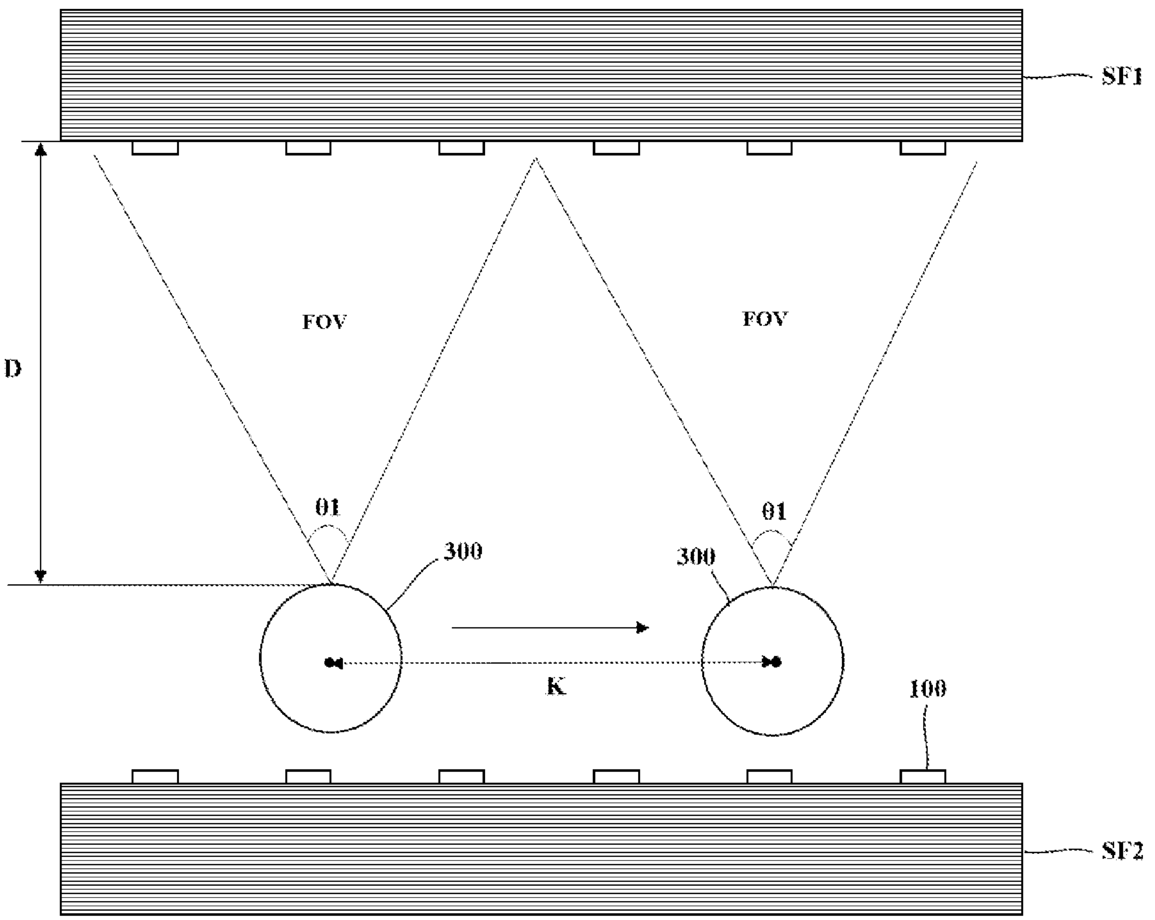
Figure 11:
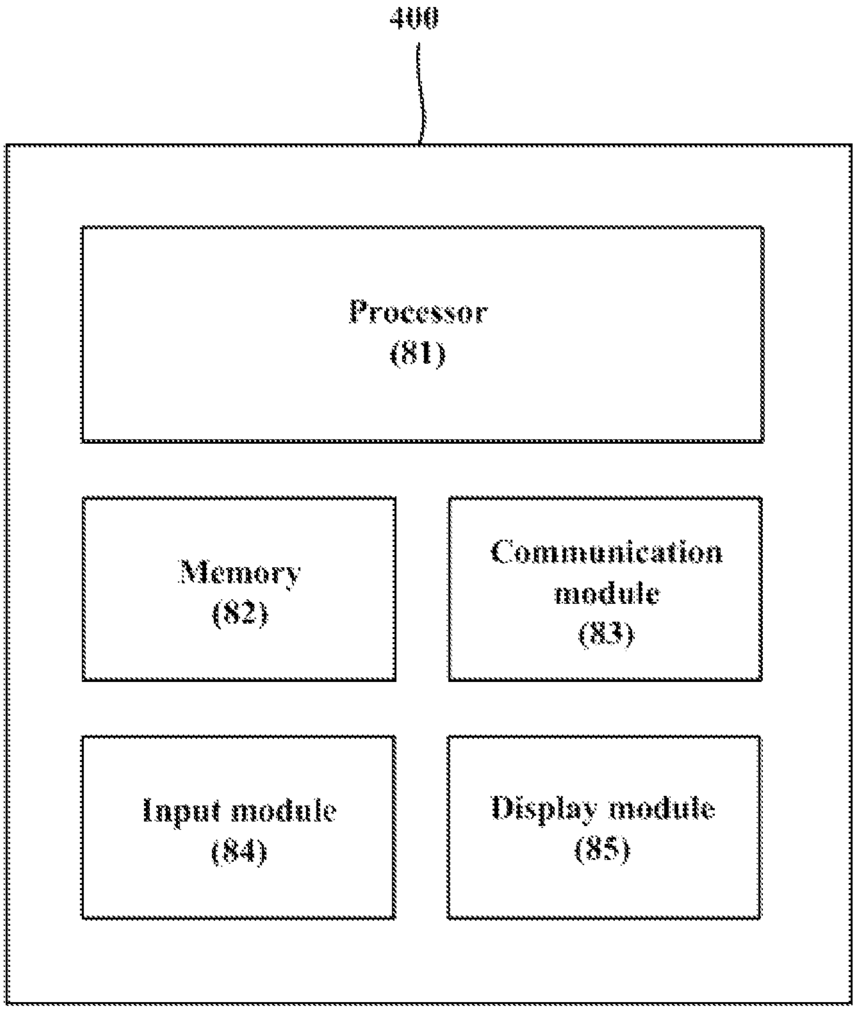
FIG. 11 is a block diagram illustrating an exemplary structure of an electronic device according to one embodiment.
Figure 12:
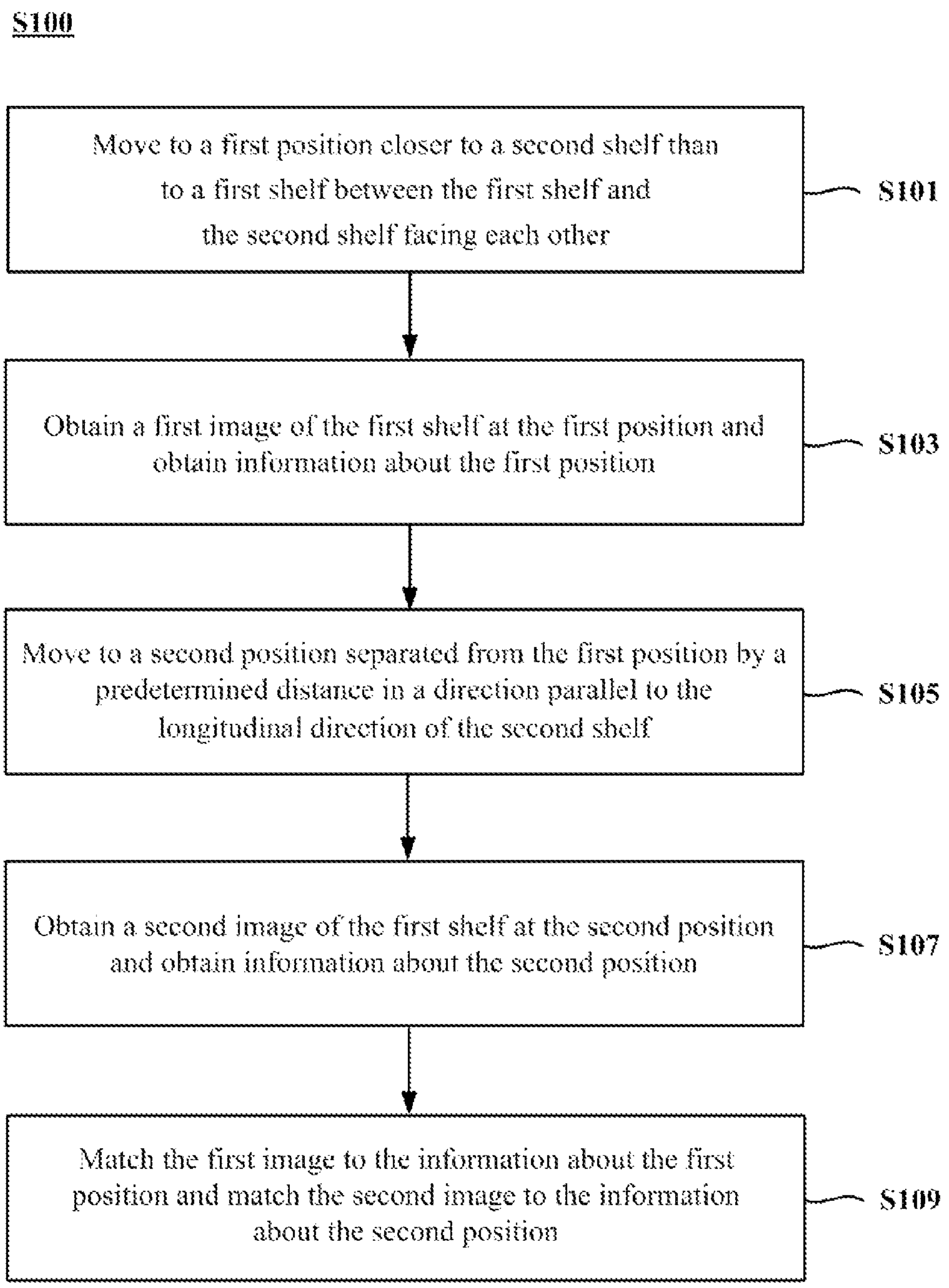
FIG. 12 is a flow diagram illustrating a shelf monitoring method according to one embodiment.
Figure 13:
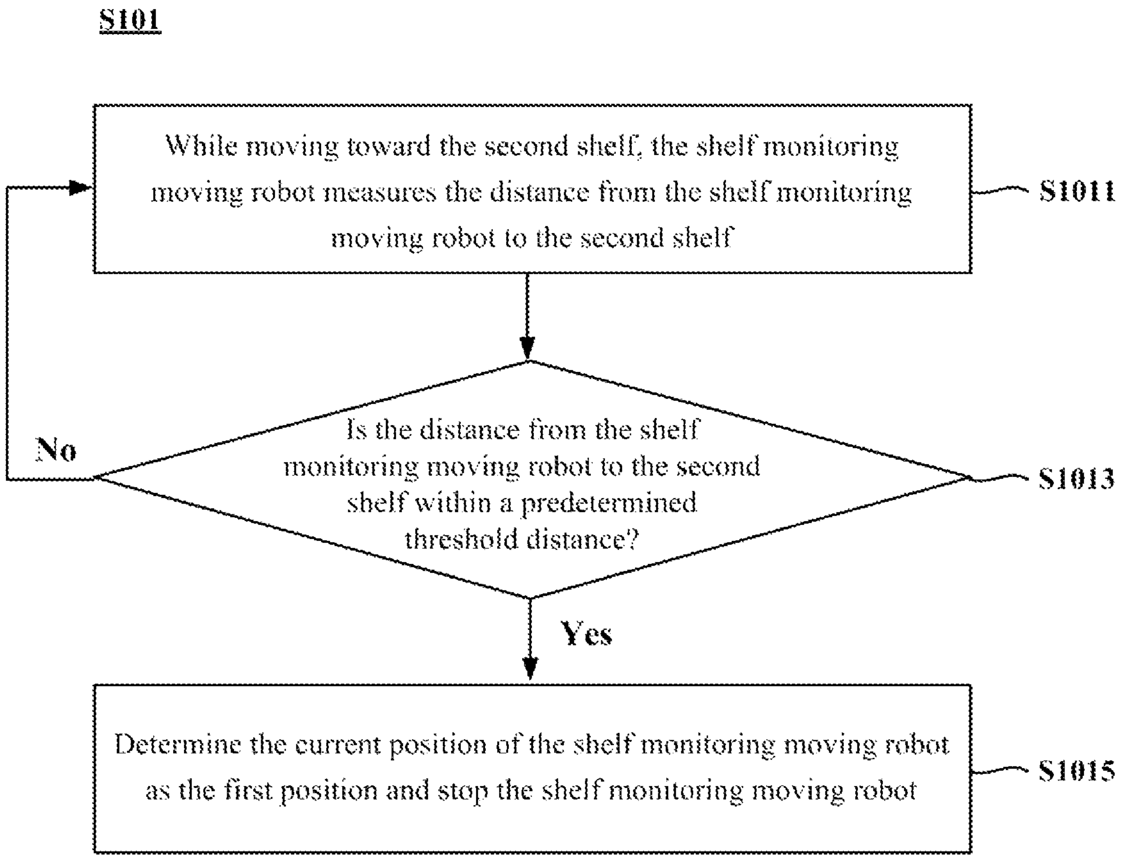
FIG. 13 is a flow diagram illustrating the step of moving to a first position of the method of FIG. 12.
Figure 14:
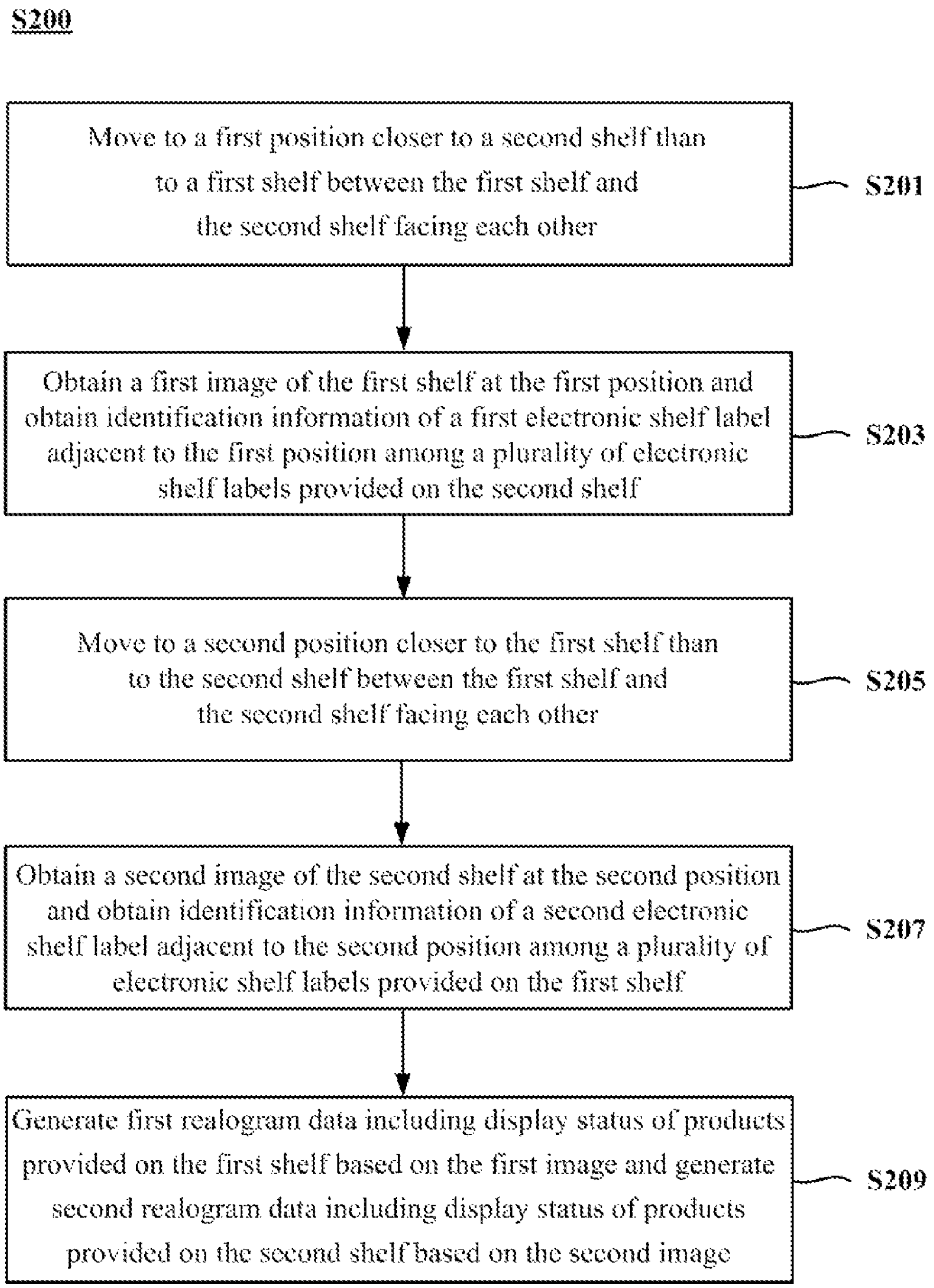
FIG. 14 is a flow diagram illustrating a shelf monitoring method according to another one embodiment.
Figure 15:
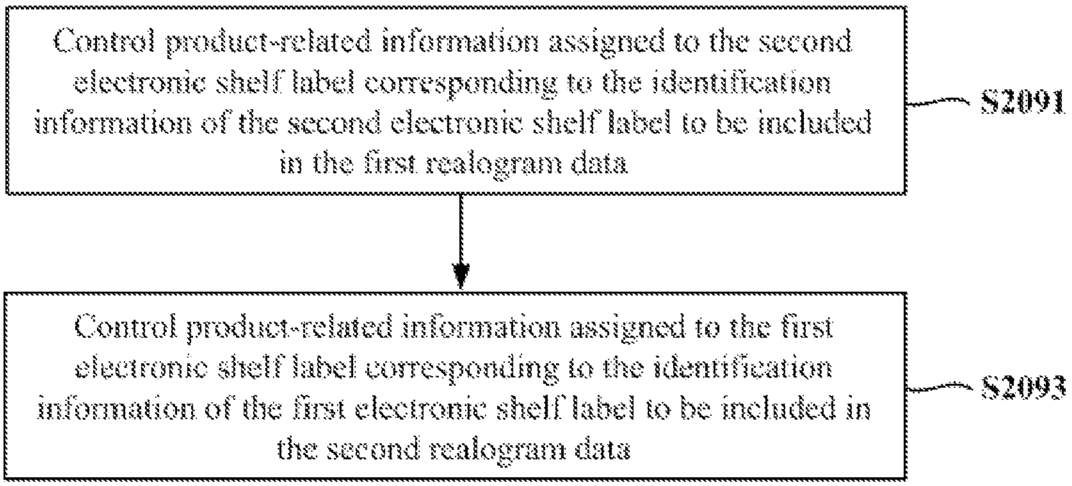
FIG. 15 is a flow diagram illustrating the step of generating realogram data of the method of FIG. 14.

FIG. 1 illustrates an exemplary structure of a shelf monitoring system 1000 according to one embodiment. FIGS. 2 and 3 illustrate a process of generating realograms while a shelf monitoring moving robot 300 according to one embodiment moves within a store. FIG. 4 is a block diagram illustrating an exemplary structure of an electronic shelf label 100 according to one embodiment. FIG. 5 is a block diagram illustrating an exemplary structure of a server 200 according to one embodiment. FIG. 6 is a block diagram illustrating an exemplary structure of a shelf monitoring moving robot 300 according to one embodiment. FIG. 7 illustrates an exemplary structure of a shelf monitoring moving robot 300 according to one embodiment. FIGS. 8 to 10 illustrate a process of monitoring the inside of a store by a shelf monitoring moving robot 300 according to one embodiment. FIG. 11 is a block diagram illustrating an exemplary structure of an electronic device 400 according to one embodiment. FIG. 12 is a flow diagram of a shelf monitoring method S100 according to one embodiment. FIG. 13 is a flow diagram illustrating the step S101 of moving to a first position of the method S100 of FIG. 12. FIG. 14 is a flow diagram illustrating a shelf monitoring method S200 according to another one embodiment. FIG. 15 is a flow diagram illustrating the step S209 of generating realogram data of the method of FIG. 14. FIGS. 16 to 19 illustrate a method for a shelf monitoring moving robot 300 according to one embodiment to generate realogram data for any one shelf by utilizing identification information of an electronic shelf label 100 provided on the other shelf facing the any one shelf.

System 1000

Referring to FIG. 1, a system 1000 according to one embodiment may comprise an electronic shelf label 100 provided on a shelf 110, a server 200, a shelf monitoring moving robot 300, and an electronic device 400. The electronic device 400 may include a portable user terminal.

The shelf monitoring system 1000 may provide an environment, in which realograms are generated in real-time based on images obtained while the shelf monitoring moving robot 300 moves within a store in which a plurality of shelves are disposed, the generated realograms are transmitted to the electronic device 400 used by the user, and the user may check the status of products on the shelf 110 and displayed status on the electronic shelf label 100 through the electronic device 400.

The electronic shelf label 100 included in the system 1000 may be linked to the server 200, and product-related information displayed on the electronic shelf label 100 may be updated in the server 200. Data related to the updated product may be transmitted from the server 200 to the electronic shelf label 100, and the electronic shelf label 100 may display information related to the updated product. In this case, the server 200 may update product-related information based on user input through the electronic device 400.

For example, a plurality of electronic shelf labels 100 and a plurality of products may be provided on the shelf 110. Each of a plurality of products may be assigned to each of a plurality of electronic shelf labels 100. Among the plurality of electronic shelf labels 100, a first product may be assigned to any first electronic shelf label, and a second product different from the first product may be assigned to any other second electronic shelf label. The first electronic shelf label and the first product may be provided adjacent to each other, and the second electronic shelf label and the second product may be provided adjacent to each other.

The server 200 may update related information of a plurality of products assigned to a plurality of electronic shelf labels 100. The server 200 may simultaneously update related information of a plurality of products and transmit the updated related information of a plurality of products to a plurality of electronic shelf labels 100. For example, the server 200 may update related information of a first product among a plurality of products and transmit the updated related information of the first product to the first electronic shelf label to which the first product is assigned. Also, the server 200 may update the related information of any other second product among the plurality of products and transmit the updated related information of the second product to the second electronic shelf label to which the second product is assigned.

Also, the server 200 may perform a predetermined operation to control the operation of the shelf monitoring moving robot 300. For example, the server 200 may transmit data about a movement route to the shelf monitoring moving robot 300 so that the shelf monitoring moving robot 300 moves along the movement route within the store. The shelf monitoring moving robot 300 may monitor the shelf 110 while moving within the store along the movement route based on data about the movement route received from the server 200.

Also, referring to FIGS. 2 and 3, the server 200 may control the shelf monitoring moving robot 300 to move among a plurality of shelves SF1, SF2, SF3 disposed in the store and monitor the plurality of shelves SF1, SF2, SF3.

In a store, for example, a first shelf SF1, a second shelf SF2, and a third shelf SF3 may be arranged to be parallel with each other. The first shelf SF1 may include a left-side surface A1 and a right-side surface A2; the second shelf SF2 may include a left-side surface A3 and a right-side surface A4; and the third shelf SF3 may include a left-side surface A5 and a right-side surface A6. In this case, the right-side surface A2 of the first shelf SF1 and the left-side surface A3 of the second shelf SF2 face each other, and the right-side surface A4 of the second shelf SF2 and the left-side surface A5 of the third shelf SF3 face each other.

The server 200 may control the shelf monitoring moving robot 300 to move between the first shelf SF1 and the second shelf SF2 facing each other sequentially through a plurality of positions closer to the second shelf SF2 than to the first shelf SF1.

For example, referring to FIG. 2, the shelf monitoring moving robot 300 may be controlled to obtain a first image Im1 by taking images of a plurality of products and electronic shelf labels provided on the right-side surface A2 of the first shelf SF1 through an observation field-of-view (FOV) directed toward the left side at one position closer to the second shelf SF2 than to the first shelf SF1. At the same time, the shelf monitoring moving robot 300 at the corresponding position may be controlled to obtain the identification information of a first electronic shelf label 101 provided on the second shelf SF2 disposed on the right side.

Also, the shelf monitoring moving robot 300 may be controlled to move a predetermined distance in a direction parallel to the longitudinal direction of the second shelf SF2 from the one position. Accordingly, the shelf monitoring moving robot 300 may move to another one position closer to the second shelf SF2 than to the first shelf SF1. The shelf monitoring moving robot 300 may be controlled to obtain a second image Im2 by taking images of a plurality of products and electronic shelf labels provided on the right-side surface A2 of the first shelf SF1 through an observation FOV directed toward the left side at the corresponding position and, at the same time, controlled to obtain the identification information of a second electronic shelf label 102 provided on the second shelf SF2 disposed on the right side.

Furthermore, for example, referring to FIG. 3, after the shelf monitoring moving robot 300 completes monitoring of the first shelf SF1, the shelf monitoring moving robot 300 may be controlled to move to one position closer to the first shelf SF1 than to the second shelf SF2.

The shelf monitoring moving robot 300 may be controlled to obtain a third image Im3 by taking images of a plurality of products and electronic shelf labels provided on the left-side surface A3 of the second shelf SF2 through an observation field-of-view (FOV) directed toward the right side at one position closer to the first shelf SF1 than to the second shelf SF2. At the same time, the shelf monitoring moving robot 300 at the corresponding position may be controlled to obtain the identification information of a third electronic shelf label 103 provided on the first shelf SF1 disposed on the left side.

Also, the shelf monitoring moving robot 300 may be controlled to move a predetermined distance in a direction parallel to the longitudinal direction of the first shelf SF1 from the one position. Accordingly, the shelf monitoring moving robot 300 may move to another one position closer to the first shelf SF1 than to the second shelf SF2.

The shelf monitoring moving robot 300 may be controlled to obtain a fourth image Im4 by taking images of a plurality of products and electronic shelf labels provided on the left-side surface A3 of the second shelf SF2 through an observation FOV directed toward the right side at the corresponding position and, at the same time, controlled to obtain the identification information of a fourth electronic shelf label 104 provided on the first shelf SF1 disposed on the left side.

The server 200 may perform computations for generating real-time realograms based on the data of images of the shelf 110 received from the shelf monitoring moving robot 300 and the identification information of electronic shelf labels 100 provided on the other shelf 110 facing the captured shelf 110.

Meanwhile, the shelf monitoring moving robot 300 may obtain information about the position of the shelf monitoring moving robot 300 by performing wireless communication with an external electronic device.

For example, the shelf monitoring moving robot 300 may transmit a beacon signal or an ultra-wideband (UWB) signal to a gateway (not shown) provided in the store, and the gateway may transmit the beacon signal or the ultra-wideband signal from the shelf monitoring moving robot 300 to the server 200.

The server 200 may obtain information about the position of the shelf monitoring moving robot 300 by analyzing the beacon signal or the ultra-wideband signal from the shelf monitoring moving robot 300 received through the gateway. The server 200 may transmit data of the information about the position of the shelf monitoring moving robot 300 to the shelf monitoring moving robot 300.

The electronic shelf label 100, the server 200, the shelf monitoring moving robot 300, and the electronic device 400 may be connected to each other through a network 500. Here, the network 500 according to the embodiment may refer to a connectivity structure in which individual nodes such as the electronic shelf label 100, the server 200, the shelf monitoring moving robot 300, and the electronic device 400 may exchange information with each other.

For example, the network 500 may include, but is not limited to, a 3rd Generation Partnership Project (3GPP) network, Long Term Evolution (LTE) network, World Interoperability for Microwave Access (WIMAX) network, Internet, Local Area Network (LAN), Wireless Local Area Network (LAN), Wide Area Network (WAN), Personal Area Network (PAN), Bluetooth network, satellite broadcasting network, analog broadcasting network, and Digital Multimedia Broadcasting (DMB) network.

The electronic shelf label 100 may be connected to the server 200 wirelessly through a separate gateway (not shown). In this case, a plurality of gateways may be disposed at regular intervals within the store, and the plurality of gateways may be connected to the server 200 via wired connection. The electronic shelf label 100 may communicate wirelessly with an adjacent gateway, and the gateway may transmit data from the electronic shelf label 100 to the server 200.

However, the present disclosure is not limited to the description above; the electronic shelf label 100 may be connected to the electronic device 400 through wireless communication. For example, the electronic shelf label 100 may be paired with the electronic device 400 based on the Bluetooth function.

In what follows, a configuration of the electronic shelf label 100 will be described with reference to FIG. 4.

Electronic Shelf Label 100

The electronic shelf label 100 may be an electronic device mounted on the shelf 110 and displaying information related to products displayed on the shelf 110. For example, the electronic shelf label 100 may display product-related information such as Korean product name, English product name, product origin, product price, raw materials, weight/calories, and discount information.

Referring to FIG. 4, the electronic shelf label 100 may include a controller 10, a display module 11, a communication module 12, a battery 13, and a memory 14.

The controller 10 is a device that controls the operation of the electronic shelf label 100 and may include a system-on-chip (SOC) structure including a central processing unit (CPU) and/or a graphics processing unit (GPU).

The controller 10 may control the operation of the display module 11 so that product-related information displayed on the display module 11 is updated based on a control signal received from the outside.

The display module 11 may be a device that displays information related to a product. The display module 11 may include an electronic paper display (EPD) that maintains product information on the screen even when power is not supplied.

The electronic paper display is suitable for the electronic shelf label 100, which requires reduced power consumption due to its bistability for maintaining the display state for a long period of time even when power supply is interrupted.

Electronic paper displays include a twisted ball type using a hemispherical twisted ball charged with electrostatic charges, an electrophoretic display using electrophoresis and microcapsules, and a cholesterol liquid crystal display using cholesterol liquid crystal.

However, the present disclosure is not limited to the description above; the display module 11 may include any one of a liquid crystal display (LCD), a thin film transistor-liquid crystal display (TFT LCD), and an organic light-emitting diode (OLED), a flexible display, and a 3D display.

The communication module 12 may include various types of communication devices that allow the electronic shelf label 100 to transmit and receive data to and from an external device. For example, the electronic device 400 and the electronic shelf label 100 may be paired through the communication module 12, and in the paired state, data from the electronic device 400 may be transmitted to the electronic shelf label 100. Also, data transmitted from the server 200 and delivered by the gateway may be received by the communication module 12.

The battery 13 may be a device that supplies power to drive constituting elements included in the electronic shelf label 100. For example, the battery 13 may include a lithium-ion battery. However, the battery 13 is not limited to the specific example above and may include various types of batteries other than lithium-ion batteries.

Also, the battery 13 may include a coin-type power supply device. However, the battery 13 is not limited to the specific type above and may include various types of power supply devices other than the coin type.

The memory 14 may be a storage for storing data, commands, and various programs for performing operations required to update product-related information displayed on the display module 11. For example, the memory 14 may include a variety of storage devices such as ROM, RAM, EPROM, a flash drive, and a hard drive.

The memory 14 and the controller 10 may be provided on a printed circuit board and electrically connected to each other.

In what follows, a configuration of the server 200 will be described with reference to FIG. 5.

Server 200

The server 200 may update product-related information assigned to the electronic shelf label 100 provided on the shelf 110 and transmit the updated product-related information to the electronic shelf label 100. In this case, the server 200 may update product-related information based on user input received through the electronic device 400.

Specifically, to update the product-related information assigned to the electronic shelf label 100, the server 200 may exchange necessary data with the electronic shelf label 100 and the electronic device 400. Accordingly, the server 200 may provide an environment required to update the product-related information.

For example, the server 200 may provide an environment in which product-related information may be updated using the electronic device 400 (e.g., a portable user terminal-type electronic device and a desktop-type electronic device). The server 200 may include an application program, data, and/or commands for operating a product-related information update application and may transmit data based thereon to the electronic devices 300, 400.

Also, the server 200 may control the operation of the shelf monitoring moving robot 300. For example, the server 200 may transmit data on the movement route to the shelf monitoring moving robot 300 so that the shelf monitoring moving robot 300 moves along the movement route within the store.

Referring to FIG. 5, the server 200 may be implemented with a predetermined electronic device that includes at least one processor 21 for data processing, a memory 22 storing application programs, data and/or instructions, at least one or more communication modules 23 exchanging data with an external device, a position information database 24 storing position information of the electronic shelf label 100, a template database 25 storing a template including product-related information, a product-related information updater 26 updating product-related information, a moving robot controller 27 controlling the operations of the shelf monitoring moving robot 300, and a realogram generator 28 generating real-time realograms based on the data obtained by the shelf monitoring moving robot 300, and a pattern code identifier 29 identifying a pattern code displayed on the electronic shelf label 100 based on the image of the electronic shelf label 100.

The processor 21 may control the overall operation of constituting elements included in the server 200 to provide an environment for the operation of a product-related information editing application to the electronic device 400. Also, the processor 21 may perform a predetermined operation to remotely control the operation of the shelf monitoring moving robot 300.

The processor 21 may be a system-on-chip (SOC) that includes a central processing unit (CPU) and/or a graphics processing unit (GPU) and may execute an operating system (OS) and/or application programs stored in the memory 22.

The processor 21 may communicate internally with each constituting element included in the server 200 through a system bus and may include one or more predetermined bus structures, including a local bus.

The processor 21 may be implemented with at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions.

The memory 22 may store one or more of an operating system (OS), various applications, data, and commands to provide and environment for controlling the shelf monitoring moving robot 300 and an environment for performing a product-related information editing method.

The memory 22 may include a program area and a data area. Here, the program area according to the embodiment may be linked between the operating system (OS) that boots the server 200 and functional elements, and the data area may store data generated through the operation of the server 200.

In one embodiment, the memory 22 may be one of various storage devices such as ROM, RAM, EPROM, a flash drive, and a hard drive or may be web storage that performs a storage function on the Internet. Also, the memory 22 may be a recording medium that is removable from the server 200.

The communication module 23 may include various types of communication devices that allow the server 200 to transmit and receive data to and from external devices.

The server 200 may transmit data based on an application program, data, and/or commands for operating a product-related information editing application to the electronic device 400 through the communication module 23.

Also, the server 200 may transmit a control signal for controlling the operation of the shelf monitoring moving robot 300 to the shelf monitoring moving robot 300 through the communication module 23.

Also, for example, the communication module 23 may receive a beacon signal or a UWB signal from the shelf monitoring moving robot and transmit the received signal to the processor 21. The processor 21 may analyze the beacon signal or the UWB signal from the shelf monitoring moving robot 300 and generate information about the position of the shelf monitoring moving robot 300.

The position information database 24 may store position information of the electronic shelf label 100. A plurality of electronic shelf labels 100 may be provided on the shelf 110 to correspond to a plurality of products. Each of the plurality of electronic shelf labels 100 may be disposed at a specific position on the shelf 110, and specific position information on the shelf 110 of the plurality of electronic shelf labels 100 may be stored in the position information database 24. In this case, the position information of each of the plurality of electronic shelf labels 100 may be matched with the unique identification information of each of the plurality of electronic shelf labels 100 and stored in the position information database 24.

For example, the first electronic shelf label among the plurality of electronic shelf labels 100 may be provided in the third row on the second floor of the first shelf provided in area A among the plurality of areas. In this case, the position information of the first electronic shelf label, described as '2nd floor, 3rd row of the first shelf in area A,' may correspond to the unique identification information of the first electronic shelf label and be stored in the database 24.

Here, the unique identification information of the electronic shelf label 100 may include a unique identification number assigned to the electronic shelf label 100.

However, the unique identification information of the electronic shelf label 100 is not limited to the specific example above and may include a unique pattern code displayed by the electronic shelf label 100.

The template database 25 may be a database that stores templates to which product-related information is applied. For example, the template database 25 may store data related to a plurality of templates into which product-related information may be input. A plurality of templates may have different forms depending on user input.

For example, a plurality of templates may be generated according to user input from a middle manager of the store, who uses the electronic device 400. The middle manager may author a template in a desired form through the electronic device 400.

The electronic device 400 may transmit data regarding a plurality of templates to the server 200, and data regarding the plurality of templates may be stored in the template database 25. However, the template database 25 is not limited to the specific example above and may store data regarding a plurality of pre-authored templates.

The product-related information updater 26 may update product-related information displayed on the electronic shelf label 100. For example, the product-related information updater 26 may control the electronic shelf label 100 so that the product-related information displayed on the electronic shelf label 100 is periodically updated according to a product-related information update rule stored in the memory 22. The product-related information update rules stored in the memory 22 may be predetermined by the user and may be modified at any time.

However, the present disclosure is not limited to the specific description above; the product-related information updater 26 may control the electronic shelf label 100 so that product-related information displayed on the electronic shelf label 100 is updated according to user input that edits product-related information.

For example, the product-related information updater 26 may control the electronic shelf label 100 to display the product-related information updated as information according to the user input is entered to a template provided from the template database 25.

The moving robot controller 27 may remotely control the shelf monitoring moving robot 300. For example, the moving robot controller 27 may control the shelf monitoring moving robot 300 to move within the store along a predetermined movement route based on the data of movement route information stored in the memory 22 or an external database and monitor the display status of products and electronic shelf label 100 provided on the shelf 100.

For this purpose, the moving robot controller 27 may transmit a movement control signal to the shelf monitoring moving robot 300 to control the shelf monitoring moving robot 300 to move along a predetermined movement route through the communication module 23. At the same time, the moving robot controller 27 may transmit data of the predetermined movement route information to the shelf monitoring moving robot 300 through the communication module 23.

Here, the movement route information may be predetermined by, for example, a user and stored in the memory 22 or an external database.

The realogram generator 28 may generate realograms that includes display status of products displayed on the shelf 110 and electronic shelf labels 100 based on the data of images obtained by the shelf monitoring moving robot 300 and the data of identification information of the electronic shelf labels.

For example, referring to FIG. 2, the shelf monitoring moving robot 300 may obtain a first image Im1 by capturing an image of the first shelf SF1 at a first position, which is one of a plurality of positions closer to the second shelf SF2 than to the first shelf SF1 between the first shelf SF1 and the second shelf SF2 facing each other.

At the same time, the shelf monitoring moving robot 300 may obtain first identification information from the first electronic shelf label 101 provided on the second shelf SF2 at the first position. For example, the shelf monitoring moving robot 300 may obtain the first identification information from the first electronic shelf label 101 through wireless communication.

Also, the shelf monitoring moving robot 300 may obtain a second image Im2 by capturing an image of the first shelf SF1 at a second position, which is another one of a plurality of positions closer to the second shelf SF2 than to the first shelf SF1 between the first shelf SF1 and the second shelf SF2. Here, the second position may be a position separated by a predetermined distance from the first position in a direction parallel to the longitudinal direction of the second shelf SF2.

At the same time, the shelf monitoring moving robot 300 may obtain second identification information from the second electronic shelf label 102 provided on the second shelf SF2 at the second position. For example, the shelf monitoring moving robot 300 may obtain the second identification information from the second electronic shelf label 102 through wireless communication.

The shelf monitoring moving robot 300 may transmit data of the first image Im1, data of the first identification information, data of the second image Im2, and data of the second identification information to the server 200.

The realogram generator 28 may stitch the first image Im1 and the second image Im2 adjacent to each other to generate realogram data including the display status of products displayed on the first shelf SF1 based on data of the first image Im1, data of the first identification information, data of the second image Im2, and data of the second identification information transmitted from the shelf monitoring moving robot 300.

For example, the realogram generator 28 may extract the first position information of the first electronic shelf label from the position information database 24 based on the data of the first identification information and extract the second position information of the second electronic shelf label from the position information database 24 based on the data of the second identification information.

The realogram generator 28 may match the data of the first image Im1 with the data of the first position information and match the data of the second image Im2 with the data of the second position information.

Accordingly, information indicating that the first image Im1 is an image captured at the first position of the first electronic shelf label provided on the second shelf SF2 may be stored in the memory 22. Also, information indicating that the second image Im2 is an image captured at the second position of the second electronic shelf label provided on the second shelf SF2 may be stored in the memory 22.

The realogram generator 28 may stitch the first image Im1 and the second image Im2 corresponding to first and second positions adjacent to each other and generate in real-time realograms including display status of products displayed on the first shelf SF1 and electronic shelf labels.

The pattern code identifier 29 may identify the pattern code displayed on the electronic shelf label 100 from an image captured by the shelf monitoring moving robot 300. Also, the pattern code identifier 29 may obtain position information of the electronic shelf label 100 assigned to the identified pattern code.

For example, the electronic shelf label 100 may display a unique pattern code corresponding to the position where the electronic shelf label 100 is provided, and the shelf monitoring moving robot 300 may capture an image of the electronic shelf label 100 displaying the pattern code. The shelf monitoring moving robot 300 may transmit image data of the electronic shelf label 100, which displays a pattern code, to the server 200.

The pattern code identifier 29 may extract the electronic shelf label 100 through an object extraction algorithm from an image captured by the shelf monitoring moving robot 300 and identify the pattern code displayed on the extracted electronic shelf label 100. Also, the pattern code identifier 29 may extract the position information of the corresponding electronic shelf label 100 from the position information database 24 based on the identified pattern code.

In the description above, it is assumed that the server 200 according to one embodiment performs the functional operation above; however, depending on the embodiments, at least part of the functional operation performed by the server 200 may be performed in an external device (e.g., the shelf monitoring moving robot 300 or the electronic device 400), or other various embodiments may be implemented such that at least part of the functional operation performed by the external device may be further performed by the server 200.

In what follows, a configuration of the shelf monitoring moving robot 300 will be described with reference to FIGS. 6 and 7.

Shelf Monitoring Moving Robot 300

The shelf monitoring moving robot 300 according to one embodiment may monitor display status of products and electronic shelf labels 100 while moving within a store.

For example, the shelf monitoring moving robot 300 may obtain image data of products and electronic shelf labels 100 within the store. In this case, the shelf monitoring moving robot 300 may obtain data of information about the position at which the images have been captured as well as the image data.

As described above, the shelf monitoring moving robot 300 may obtain images of products and electronic shelf labels 100 and information about the positions at which the images have been taken simultaneously and match the data of captured images with the data of information about the positions at which the images have been captured.

However, the present disclosure is not limited to the specific operation above; when the shelf monitoring moving robot 300 transmits the data of captured images and data of identification information of the electronic shelf labels 100 adjacent to the image capture positions to the server 200, the server 200 may extract the position information of the electronic shelf label 100 based on the identification information of the electronic shelf label 100. Subsequently, the server 200 may match the image data received from the shelf monitoring moving robot 300 with the extracted position information.

Referring to FIG. 6, the shelf monitoring moving robot 300 according to one embodiment may comprise a power module 30, a driving module 40, a sensor module 50, a wireless communication module 60, a memory 61, a navigation module 62, and a controller 70.

Also, referring to FIG. 7, the shelf monitoring moving robot 300 may include a body comprising a pillar portion 311 and a base 312 provided below the pillar portion 311 to provide locomotion. A plurality of wheels w1, w2 in contact with the ground may be provided under the base 312.

The power module 30, the driving module 40, the sensor module 50, the wireless communication module 60, the memory 61, the navigation module 62, and the controller 70 may be provided inside the body 310.

The power module 30 may include a battery 31 that supplies power to the shelf monitoring moving robot 300 and a power management device 32 controlling the supply of power from the battery 31 to other constituting elements of the shelf monitoring moving robot 300.

The battery 31 is a source that supplies power required to drive the shelf monitoring moving robot 300 and may include, for example, a lithium-ion battery.

The power management device 32 may be connected to the battery 31 and adjust the voltage and current supplied by the battery 31 to meet the power system requirements of the shelf monitoring moving robot 300.

The driving module 40 may be a module that supports driving of the shelf monitoring moving robot 300 by utilizing power provided from the power module 30.

For example, the driving module 40 may include a power generator 41 that provides power to move a plurality of wheels w1, w2 provided at the bottom of the base 312 so that the shelf monitoring moving robot 300 moves within the store.

In this case, the rotation speed and rotation direction of the first wheel w1 and the second wheel w2 may be controlled independently. Accordingly, since the rotation speed and rotation direction of the first wheel w1 and the second wheel w2 are controlled separately, the shelf monitoring moving robot 300 may be controlled to change direction or rotate in place.

Also, the driving module 40 may include a body rotation device 42 that enables the pillar portion 311 to rotate with respect to the base 312.

The pillar portion 311 may be configured to rotate with respect to the base 312 around a central axis passing through the pillar portion 311 and the base 312, and the body rotation device 42 may provide power required to rotate the pillar portion 311.

Accordingly, in a situation where the shelf monitoring moving robot 300 is stopped in place, only the pillar portion 311 may rotate, and a first imaging device c1 and a second imaging device c2 provided on the pillar portion 311 may switch the direction of their observation FOV.

The sensor module 50 may include a front detection sensor 51, an imaging device 52, a distance sensor 53, and an IMU sensor 54.

The front detection sensor 51 may include an RGB camera 11 that captures an image of the scene in the movement direction of the shelf monitoring moving robot 300. For example, referring to FIG. 7, the RGB camera 11 may be provided in front of the pillar portion 311 to capture an image of the front of the shelf monitoring moving robot 300.

A visual simultaneous localization and mapping (SLAM) system may be implemented, which enables simultaneous mapping of the surrounding environment and real-time localization of the shelf monitoring moving robot 300 through an RGB camera 11.

For example, image data of the surrounding environment of the shelf monitoring moving robot 300 moving inside the store captured by the RGB camera 11 may be transmitted to the controller 70 or to the server 200.

The controller 70 or the server 200 may process images of the surrounding environment of the shelf monitoring moving robot 300 to perform mapping of the surrounding environment of the shelf monitoring moving robot 300 and, at the same time, perform real-time localization of the monitoring moving robot 300 within the store.

Also, the front detection sensor 51 may further include a distance sensor provided in front of the shelf monitoring moving robot 300. The distance sensor provided in front of the shelf monitoring moving robot 300 may detect an obstacle that appears in front of the shelf monitoring moving robot 300. When an obstacle is detected by the distance sensor provided in front of the shelf monitoring moving robot 300, the shelf monitoring moving robot 300 may be controlled to avoid the obstacle.

The imaging device 52 may be configured to capture images of a plurality of shelves SF1, SF2, SF3 while the shelf monitoring moving robot 300 moves within the store. For example, the imaging device 52 may include a camera.

For example, referring to FIG. 7, the first imaging device c1 may be provided on the left side of the shelf monitoring moving robot 300, and the second imaging device c2 may be provided on the right side thereof.

The first imaging device c1 may capture the image of a shelf provided on the left side of the shelf monitoring moving robot 300 through the first observation field of view FOV1.

The second imaging device c2 may capture the image of a shelf provided on the right side of the shelf monitoring moving robot 300 through the second observation field of view FOV2.

However, the present disclosure is not limited to the specific example above; only one of the first imaging device c1 and the second imaging device c2 may be included in the shelf monitoring moving robot 300. In this case, a single imaging device may still capture images of shelves provided in various directions with respect to the monitoring moving robot 300 through rotation of the pillar portion 311.

For example, when the first imaging device c1 is provided only on the left side of the shelf monitoring moving robot 300, the first imaging device c1 may preferentially capture images of a shelf provided on the left side of the shelf monitoring moving robot 300. Then, the pillar portion 311 may rotate 180 degrees, and the first imaging device c1 may also capture images of a shelf provided on the right side of the shelf monitoring moving robot 300.

The data of images of a plurality of shelves SF1, SF2, SF3 obtained by the imaging device 52 may be transmitted to the controller 70 and/or the server 200. The controller 70 and/or the server 200 may utilize the data of images of the plurality of shelves SF1, SF2, SF3 from the imaging device 52 to generate realograms.

The distance sensor 53 may be configured to sense the distance to a plurality of shelves SF1, SF2, SF3 while the shelf monitoring moving robot 300 moves within the store.

For example, referring to FIG. 7, a first distance sensor d1 may be provided on the left side of the shelf monitoring moving robot 300, and a second distance sensor d2 may be provided on the right side thereof.

The first distance sensor d1 may sense the distance to a shelf provided on the left side of the shelf monitoring moving robot 300.

The second distance sensor d2 may sense the distance to a shelf provided on the right side of the shelf monitoring moving robot 300.

However, the present disclosure is not limited to the specific example; only one of the first distance sensor d1 and the second distance sensor d2 may be included in the shelf monitoring moving robot 300. In this case, a single distance sensor may still measure the distance to a shelf provided in various directions with respect to the monitoring moving robot 300 through rotation of the pillar portion 311.

The IMU sensor 54 may be configured to measure the attitude of the shelf monitoring moving robot 300. For example, the IMU sensor 54 may include gyroscopes and acceleration sensors.

The IMU sensor 54 may measure the attitude of the shelf monitoring moving robot 300 moving within the store in real-time and transmit data of the attitude information of the shelf monitoring moving robot 300 to the controller 70 and/or the server 200.

The attitude information of the shelf monitoring moving robot 300 sensed by the IMU sensor 54 may be used to estimate the real-time position of the shelf monitoring moving robot 300 within the store more accurately in implementing a visual SLAM system based on data from the front detection sensor 51 by the controller 70 or the server 200.

The wireless communication module 60 is a device that enables the shelf monitoring moving robot 300 to communicate wirelessly with the electronic shelf label 100, the server 200, and the electronic device 400.

For example, the wireless communication module 60 may be configured to wirelessly communicate with the server 200 and the electronic device 400 through wireless communication such as LTE or 5G.

Also, for example, the wireless communication module 60 may be configured to perform short-range wireless communication with the electronic shelf label 100.

For example, the wireless communication module 60 may include a Bluetooth low energy (BLE) device, a radio frequency identification (RFID) tag, and a near field communication (NFC) tag.

For example, referring to FIG. 7, the wireless communication module 60 may include a plurality of wireless signal transceivers i1, i2 for performing short-range wireless communication with the electronic shelf label 100.

A plurality of wireless signal transceivers i1, i2 may be configured to receive a BLE signal, an RFID signal, and the like. Also, a plurality of wireless signal transceivers i1, i2 may be composed of NFC tags.

For example, a first wireless signal transceiver i1 may be provided on the left side of the shelf monitoring moving robot 300, and a second wireless signal transceiver i2 may be provided on the right side.

The first wireless signal transceiver i1 may communicate wirelessly with the electronic shelf label 100 displayed on the shelf provided to the left of the shelf monitoring moving robot 300.

Data of identification information of the electronic shelf label 100 displayed on the shelf provided on the left side of the shelf monitoring moving robot 300 may be obtained by the first wireless signal transceiver i1.

The second wireless signal transceiver i2 may communicate wirelessly with the electronic shelf label 100 displayed on the shelf provided to the right of the shelf monitoring moving robot 300.

Data of identification information of the electronic shelf label 100 displayed on the shelf provided on the right side of the shelf monitoring moving robot 300 may be obtained by the second wireless signal transceiver i2.

However, the present disclosure is not limited to the specific example; only one of the first wireless signal transceiver i1 and the second wireless signal transceiver i2 may be included in the shelf monitoring moving robot 300. In this case, a single wireless signal transceiver may still communicate wirelessly with the electronic shelf label 100 displayed on a shelf provided in various directions with respect to the monitoring moving robot 300 through rotation of the pillar portion 311.

Furthermore, the wireless communication module 60 may include a communication device that transmits a beacon signal or UWB signal. The beacon signal or UWB signal transmitted from the wireless communication module 60 may be transmitted to the server 200 through a gateway.

The memory 61 stores data supporting various functions of the shelf monitoring moving robot 300. For example, the memory 61 may store a plurality of application programs (or applications) running on the shelf monitoring moving robot 300, along with data and commands for the operation of the shelf monitoring moving robot 300. At least part of the application programs may be downloaded from the server 200 through wireless communication.

The memory 61 may include various storage devices such as ROM, RAM, EPROM, a flash drive, and a hard drive.

The navigation module 62 may guide the shelf monitoring moving robot 300 to move along a movement route inside the store provided with a plurality of shelves SF1, SF2, SF3.

For example, referring to FIG. 8, the navigation module 62 may guide the shelf monitoring moving robot 300 to move along a predetermined movement route Tr1 based on data of the predetermined movement route information provided by the server 200.

In this case, the navigation module 62 may match the surrounding environment of the shelf monitoring moving robot 300 with the predetermined movement route Tr1 based on mapping data of the surrounding environment of the shelf monitoring moving robot 300. Accordingly, the navigation module 62 may guide the shelf monitoring moving robot 300 to move along the predetermined movement route Tr1 within the store where the shelf monitoring moving robot 300 is located.

The controller 70 may control overall operation of constituting elements included in the shelf monitoring moving robot 300 and perform data processing for a series of operations to be described later.

The controller 70 may be implemented with application specific integrated circuits (ASICs), digital signal processors (DSPs), digital signal processing devices (DSPDs), programmable logic devices (PLDs), field programmable gate arrays (FPGAs), and controllers, micro-controllers, microprocessors, or any other type of processor to perform other functions.

In what follows, a process for the shelf monitoring moving robot 300 to monitor the interior of the store will be described with reference to FIGS. 8 to 10.

Referring to FIG. 8, the shelf monitoring moving robot 300 may be controlled to move within a store where a plurality of shelves SF1, SF2, SF3 are arranged parallel with each other and monitor the plurality of shelves SF1, SF2, SF3.

In this case, the shelf monitoring moving robot 300 may move inside the store along the predetermined movement route Tr1. For example, the shelf monitoring moving robot 300 may be controlled to move between the first shelf SF1 and the second shelf SF2 facing each other and to capture images of the first shelf SF1 and the second shelf SF2.

Afterward, the shelf monitoring moving robot 300 may be controlled to move to the third shelf SF3 and capture images of the second shelf SF2 and the third shelf SF3 while moving between the second shelf SF2 and the third shelf SF3.

Also, the shelf monitoring moving robot 300 may be located initially at the center position between the first shelf SF1 and the second shelf SF2 at which distances from the shelf monitoring moving robot 300 to the first shelf SF1 and to the second shelf SF2 are the same.

In this case, the shelf monitoring moving robot 300 may capture an image of the first shelf SF1 through the first observation field of view FOV1 and capture an image of the second shelf SF2 through the second observation field of view FOV2.

Meanwhile, referring to FIG. 9, the shelf monitoring moving robot 300 may move between the first shelf SF1 and the second shelf SF2 to a position closer to either the first shelf SF1 or the second shelf SF2.

For example, the controller 70 may use a feature extraction algorithm to compare the first image of the first shelf SF1 captured by the first imaging device c1 of the shelf monitoring moving robot 300 and the second image of the second shelf SF2 captured by the second imaging device c2 with the realograms pre-stored in the memory 61.

Here, the feature extraction algorithm is an algorithm that extracts unique features from an image, including, for example, Scale-Invariant Feature Transform (SIFT), Speeded Up Robust Features (SURF), and Oriented FAST and Rotated BRIEF (ORB) algorithm. The controller 70 may calculate the similarity between images based on features extracted from the images.

The controller 70 may select an image determined as not being included in the realograms between the first image and the second image. Here, the fact that the image is not included in the realograms may mean that the similarity between the selected image and the realogram is below a predetermined threshold.

The controller 70 may determine the shelf of which the image is not included in the realograms as a realogram generation target.

For example, when the first image is determined as being not included in the realogram between the first image and the second image, the controller 70 may determine the first shelf SF1 as the realogram generation target.

In this case, the controller 70 may control the shelf monitoring moving robot 300 to move closer to the second shelf SF2 than to the first shelf SF1 so that the first shelf SF1 may be captured in a wide perspective.

However, the present disclosure is not limited to the specific description above; when both the first image and the second image are not included in the realogram, the controller 70 may selects either of the first shelf SF1 and the second shelf SF2 as a realogram generation target.

In this case, the controller 70 may control the shelf monitoring moving robot 300 to move away from one of the first shelf SF1 and the second shelf SF2 determined as the realogram generation target and move closer to the other shelf facing the shelf determined as the realogram generation target.

As described above, the shelf monitoring moving robot 300 may be controlled to move between the first shelf SF1 and the second shelf SF2 to a first position closer to the second shelf SF2 than to the first shelf SF1.

At the first position closer to the second shelf SF2 than to the first shelf SF1, the shelf monitoring moving robot 300 may capture the first shelf SF1 using the first imaging device c1.

At the same time, the shelf monitoring moving robot 300 may obtain information about the first position.

For example, the shelf monitoring moving robot 300 may obtain information about the first position based on analysis of the beacon signal or UWB signal by the server 200 through wireless communication.

Also, the shelf monitoring moving robot 300 at the first position may obtain identification information of the first electronic shelf label 101 adjacent to the first position among a plurality of electronic shelf labels 100 provided on the second shelf SF2.

As information about the first location, the controller 70 may obtain position information of the first electronic shelf label 101 based on identification information of the first electronic shelf label 101.

In this case, the controller 70 may extract the position information of the first electronic shelf label 101 corresponding to the identification information of the first electronic shelf label 101 from the position information database 24 of the server 200 or an external database configured separately.

When the shelf monitoring moving robot 300 obtains identification information of the first electronic shelf label 101, a second wireless signal transceiver i2 or a second imaging device c2 may be used.

For example, the shelf monitoring moving robot 300 may perform wireless communication with the first electronic shelf label 101 through the second wireless signal transceiver i2 to obtain identification information of the first electronic shelf label 101.

Also, for example, the shelf monitoring moving robot 300 may identify a pattern code displayed on the first electronic shelf label 101 from the image of the first electronic shelf label 101 captured by the second imaging device c2. The controller 70 may obtain identification information of the first electronic shelf label 101 based on the pattern code identified from the image captured by the second imaging device c2.

In this respect, the second wireless signal transceiver i2 and the second imaging device c2 may be referred to as an electronic shelf label identification device.

Meanwhile, as the shelf monitoring moving robot 300 moves to the first position closer to the second shelf SF2 than to the first shelf SF1, the second distance sensor d2 provided on the pillar portion 311 may measure the distance from the shelf monitoring moving robot 300 to the second shelf SF2.

When controlling the driving module 40 to move the shelf monitoring moving robot 300 to the first position, the controller 70 may control the driving module 40 to move the shelf monitoring moving robot 300 to a position within a predetermined threshold distance from the second shelf SF2 based on the distance information from the shelf monitoring moving robot 300 to the second shelf SF2 measured by the second distance sensor d2.

Here, the predetermined threshold distance may be a distance within which the second wireless signal transceiver i2 may perform short-range wireless communication with the first electronic shelf label 101 provided on the second shelf SF2. For example, if the second wireless signal transceiver i2 is an NFC tag, the predetermined threshold distance may be within 10 cm.

Also, the predetermined threshold distance may be a distance within which an image of the first electronic shelf label 101 with sufficient resolution may be obtained, at which a pattern code displayed on the first electronic shelf label 101 provided on the second shelf SF2 may be identified by the second imaging device c2 of the shelf monitoring moving robot 300.

Furthermore, referring to FIG. 9, the shelf monitoring moving robot 300 may be controlled to move from the first position closer to the second shelf SF2 to the second position separated by a predetermined distance in a direction parallel to the longitudinal direction of the second shelf SF2.

The shelf monitoring moving robot 300 at the second position may capture the first shelf SF1 using the first imaging device c1.

At the same time, the shelf monitoring moving robot 300 may obtain information about the second position.

For example, the shelf monitoring moving robot 300 may obtain information about the second position based on analysis of a beacon signal or UWB signal of the server 200 through wireless communication.

Also, the shelf monitoring moving robot 300 at the second position may acquire identification information of the second electronic shelf label 102 adjacent to the second position among the plurality of electronic shelf labels 100 provided on the second shelf SF2.

The controller 70 may obtain position information of the second electronic shelf label 102 based on identification information of the second electronic shelf label 102 as information about the second position.

The method of obtaining the identification information and position information of the second electronic shelf label 102 is substantially the same as the method of obtaining the identification information and position information of the first electronic shelf label 101 described above.

As the shelf monitoring moving robot 300 moves from the first position to the second position, the first distance sensor d1 provided on the pillar portion 311 may measure the distance from the shelf monitoring moving robot 300 to the first shelf SF1.

When controlling the driving module 40 to move the shelf monitoring moving robot 300 from the first position to the second position, the controller 70 may determine a predetermined separation distance between the first position and the second position based on the field-of-view information of the first imaging device c1 and the distance information from the shelf monitoring moving robot 300 to the first shelf SF1 measured by the first distance sensor d1.

For example, referring to FIG. 10, the distance D from the shelf monitoring moving robot 300 to the first shelf SF1 measured by the first distance sensor d1 at the first position may be measured.

The controller 70 may determine a value obtained by doubling the multiplication of the distance D from the shelf monitoring moving robot 300 to the first shelf SF1 and the tangent value of half the angle of view (01) of the first imaging device c1, $$\left(\tan\frac{\theta_1}{2}\right),$$

as a predetermined separation distance K between the first position and the second position.

The controller 70 may match the first image of the first shelf SF1 at the first position to the position information of the first electronic shelf label 101 obtained based on the identification information of the first electronic shelf label 101 at the first position and store the matched information in the memory 61.

Also, the controller 70 may match the second image of the first shelf SF1 at the second position to the position information of the second electronic shelf label 102 obtained based on the identification information of the second electronic shelf label 101 at the second position and store the matched information in the memory 61.

The controller may stitch the first image and the second image adjacent to each other to generate realogram data including the display status of products displayed on the first shelf SF1 based on data generated by matching the first image with the information about the first position and matching the second image with the information about the second position.

In a similar manner, the controller 70 may generate realogram data including the display status of products displayed on the second shelf SF2.

Meanwhile, when stitching the first image with the second image, the controller 70 may extract an overlapping area between the first image and the second image using a feature extraction algorithm and stitch the first image with the second image so that the overlapping areas is not repeatedly accounted for.

As described above, while moving between the first shelf SF1 and the second shelf SF2 sequentially through a plurality of positions closer to the second shelf SF2 than to the first shelf SF1, the shelf monitoring moving robot 300 may sequentially obtain a plurality of images obtained by sequentially capturing the first shelf SF1 at a plurality of positions and identification information for the electronic shelf labels 101, 102 adjacent to the plurality of positions of the shelf monitoring moving robot 300 capturing the first shelf SF1 among a plurality of electronic shelf labels 100 provided on the second shelf SF2.

Also, similarly to the description above, while moving between the first shelf SF1 and the second shelf SF2 sequentially through a plurality of positions closer to the second shelf SF1 than to the first shelf SF2, the shelf monitoring moving robot 300 may sequentially obtain a plurality of images obtained by sequentially capturing the second shelf SF2 at a plurality of positions and identification information for the electronic shelf labels 101, 102 adjacent to the plurality of positions of the shelf monitoring moving robot 300 capturing the second shelf SF2 among a plurality of electronic shelf labels 100 provided on the first shelf SF1.

In what follows, a configuration of the electronic device 400 will be described with reference to FIG. 11.

Electronic Devices (400)

The electronic device 400 may be a device in which a shelf monitoring application and/or a product-related information editing application is installed. The electronic device 400 may include a portable user terminal.

For example, the user of the electronic device 400 may be a store employee or a store customer.

The electronic device 400 may be implemented, for example, with a computer or a portable terminal that may connect to the server 200 through the network 500.

Here, the computer may include, for example, a notebook, a desktop, a laptop, a VR HMD (e.g., HTC VIVE, Oculus Rift, GearVR, DayDream, or PSVR) equipped with a web browser.

Portable terminals may include, for example, not only wireless communication devices that ensure portability and mobility, such as smart phones, tablet PCs, and wearable devices but also various devices equipped with communication modules, such as Bluetooth Low Energy (BLE), NFC, RFID, ultrasonic, infrared, WiFi, and LiFi modules.

Referring to FIG. 11, the electronic device 400 may include a processor 81, a memory 82, a communication module 83, an input module 84, and a display module 85.

Various constituting elements included in the electronic device 400 may be designed to be included within the housing of the electronic device 400.

In an embodiment, the processor 81 may control the overall operation of constituting elements included in the electronic device 400 through a shelf monitoring application and/or a product-related information editing application stored in the memory 22 to provide a shelf monitoring environment and/or an environment for editing product-related information.

For example, the processor 81 may control the operation of the communication module 83 and the input module 84 to transmit a signal according to a user input received through the input module 84 to the electronic shelf label 100.

The processor 81 may include a central processing unit (CPU) and/or a graphics processing unit (GPU). The processor 81 may be implemented with at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions.

The memory 82 may store commands and data that may be used to generate a shelf monitoring environment and/or a product-related information editing environment.

A shelf monitoring application and/or a product-related information editing application may be stored in the memory 82.

The shelf monitoring application may provide a user interface through which the operation of the shelf monitoring moving robot 300 may be controlled or realogram information may be provided based on data obtained by the shelf monitor moving robot 300.

The product-related information editing application may provide various types of user interfaces to provide a product-related information editing environment.

The memory 82 may include at least one or more non-transitory computer-readable storage media and transitory computer-readable storage media. For example, the memory 82 may be one of various storage devices such as ROM, RAM, EPROM, a flash drive, and a hard drive. Also, the memory 82 may include web storage that performs a data storage function on the Internet.

The communication module 83 may include various types of communication devices that enable transmission and reception of data to and from external devices. For example, the communication module 83 may transmit and receive data to and from the electronic shelf label 100 and/or the server 200 through a wireless network.

The communication module 83 may be configured to transmit and receive data to and from an external device via Bluetooth communication. For example, the communication module 83 may receive a pairing signal from the electronic shelf label 100 and pair with the electronic shelf label 100 via Bluetooth communication.

The input module 84 may be configured to receive various types of user input from a user using the electronic device 400. For example, the input module 84 may include a touch screen that receives a user's touch input.

When the input module 84 is implemented with a touch screen, the input module 84 may be formed by being integrally combined with the display module 85. However, the present disclosure is not limited to the specific description; the input module 84 may further include a keyboard capable of receiving user input in the form of characters.

The display module 85 may display content related to a shelf monitoring application and/or a product-related information update application included in the memory 82.

For example, the display module 85 may include a display device that displays various types of user interface images to provide a control environment for the shelf monitoring moving robot 300 for shelf monitoring or an environment for updating product-related information.

The display module 25 may include any one of a liquid crystal display (LCD), a thin film transistor-liquid crystal display (TFT LCD), an organic light-emitting diode (OLED), a flexible display, and a 3D display.

In what follows, a shelf monitoring method S100 will be described with reference to FIGS. 12 to 13.

Shelf Monitoring Method S100, S200

A shelf monitoring method S100, S200 may be performed, the method being performed as the shelf monitoring moving robot 300 is controlled by the processor 21 of the server 200 according to one embodiment.

However, the present disclosure is not limited to the description above; at least some portions of the method S100, S200 may be performed by the controller 70 of the shelf monitoring moving robot 300 or the processor 81 of the electronic device 400, and other portions may be performed by the processor 21 of the server 200.

For example, at least one of the processor 21 of the server 200, the controller 70 of the shelf monitoring moving robot 300, and the processor 81 of the electronic device 400 may control the shelf monitoring moving robot 300 by executing at least one command stored in the memory 22 of the server 200, the memory 61 of the shelf monitoring moving robot 300, or the memory 82 of the electronic device 400 and perform the shelf monitoring method S100, S200 which monitors the shelf within a store.

In what follows, the present disclosure will be described based on an assumption that the processor 21 of the server 200 controls the shelf monitoring moving robot 300 to perform the method S100, S200.

Referring to FIG. 12, the shelf monitoring method S100 according to one embodiment may comprise moving to a first position closer to a second shelf SF2 than to a first shelf SF1 between the first shelf SF1 and the second shelf SF2 facing each other S101, obtaining a first image of the first shelf SF1 at the first position and obtaining information about the first position S103, moving to a second position separated from the first position by a predetermined distance in a direction parallel to the longitudinal direction of the second shelf SF2 S105, obtaining a second image of the first shelf SF1 at the second position and obtaining information about the second position S107, and matching the first image to the information about the first position and the second image to the information about the second position S109.

In the S101 step, the processor 21 of the server 200 may control the shelf monitoring moving robot 300 to move to the first position, which is any one of a plurality of positions closer to the second shelf SF2 than to the first shelf SF1 between the first shelf SF1 and the second shelf SF2.

Here, a plurality of positions close to the second shelf SF2 may be separated by a predetermined distance in a direction parallel to the longitudinal direction of the second shelf SF2.

Referring to FIG. 13, the step S101 may include measuring a distance to the second shelf SF2 by the shelf monitoring moving robot 300 S1011, determining whether the distance from the shelf monitoring moving robot 300 to the second shelf SF2 is within a predetermined threshold distance S1013, and determining the current position of the shelf monitoring moving robot 300 as the first position and stopping the shelf monitoring moving robot 300 S1015.

In the S1011 step, while moving toward the second shelf SF2, the shelf monitoring moving robot 300 may measure the distance from the shelf monitoring moving robot 300 to the second shelf SF2 by utilizing a second distance sensor d2 of the shelf monitoring moving robot 300.

In the S1013 step, the processor 21 of the server 200 may determine whether the distance from the shelf monitoring moving robot 300 to the second shelf SF2 is within a predetermined threshold distance.

Here, the predetermined threshold distance may be a distance within which the second wireless signal transceiver i2 of the shelf monitoring moving robot 300 may perform short-range wireless communication with the first electronic shelf label 101 provided on the second shelf SF2.

Also, the predetermined threshold distance may be a distance within which an image of the first electronic shelf label 101 with sufficient resolution may be obtained, at which a pattern code displayed on the first electronic shelf label 101 provided on the second shelf SF2 may be identified by the second imaging device c2 of the shelf monitoring moving robot 300.

In the S1015 step, when it is determined that the distance from the shelf monitoring moving robot 300 to the second shelf SF2 is within a predetermined threshold distance, the processor 21 of the server 200 may determine the current position of the shelf monitoring moving robot 300 as the first position for capturing the first shelf SF1 and, at the same time, control the shelf monitoring moving robot 300 to be stopped.

In the S103 step, the processor 21 of the server 200 may control the shelf monitoring moving robot 300 to capture the first shelf SF1 at the first position close to the second shelf SF2 and obtain the first image.

At the same time, the processor 21 of the server 200 may obtain information about the first position where the shelf monitoring moving robot 300 is located.

For example, the processor 21 of the server 200 may analyze a beacon signal or a UWB signal from the shelf monitoring moving robot 300 and generate information about the first position at which the shelf monitoring moving robot 300 is located.

Also, for example, the processor 21 of the server 200 may control the shelf monitoring moving robot 300 to obtain, at the first position adjacent to the second shelf SF2, identification information of the first electronic shelf label 101 adjacent to the first position among a plurality of electronic shelf labels 100 provided on the second shelf SF2 facing the first shelf SF1.

The processor 21 of the server 200 may obtain, as the information about the first position at which the shelf monitoring moving robot 300 is located, information about the first position of the first electronic shelf label 101 based on the identification information of the first electronic shelf label 101.

In the S105 step, the processor 21 of the server 200 may control the shelf monitoring moving robot 300 to move from the first position to the second position.

Here, the second position may be any one position other than the first position among of a plurality of positions closer to the second shelf SF2 than to the first shelf SF1 separated by a predetermined distance in a direction parallel to the longitudinal direction of the second shelf SF2. For example, the second location may be the point closest to the first location among the plurality of positions.

In the S107 step, the processor 21 of the server 200 may control the shelf monitoring moving robot 300 to obtain a second image by capturing the first shelf SF1 at the second position close to the second shelf SF2.

At the same time, the processor 21 of the server 200 may obtain information about the second position at which the shelf monitoring moving robot 300 is located.

For example, the processor 21 of the server 200 may analyze a beacon signal or a UWB signal from the shelf monitoring moving robot 300 and generate information about the second position at which the shelf monitoring moving robot 300 is located.

Also, for example, the processor 21 of the server 200 may control the shelf monitoring moving robot 300 to obtain, at the second position adjacent to the second shelf SF2, identification information of the second electronic shelf label 102 adjacent to the second position among a plurality of electronic shelf labels 100 provided on the second shelf SF2 facing the first shelf SF1.

The processor 21 of the server 200 may obtain, as the information about the second position at which the shelf monitoring moving robot 300 is located, information about the second position of the second electronic shelf label 102 based on the identification information of the second electronic shelf label 102.

As described above, through the S101 to S107 steps, the processor 21 of the server 200 may control the shelf monitoring moving robot 300 to move between the first shelf SF1 and the second shelf SF2 facing each other within the store sequentially through a plurality of positions closer to the second shelf SF2 than to the first shelf SF1.

Also, the processor 21 of the server 200 may control the shelf monitoring moving robot 300 to sequentially capture the first shelf SF1 at each of a plurality of positions closer to the second shelf SF2 than to the first shelf SF1 and, at the same time, sequentially obtain identification information of an electronic shelf label 100 adjacent to each of the plurality of positions among a plurality of electronic shelf labels 100 provided on the second shelf SF2.

In the S109 step, the processor 21 of the server 200 may match the first image to the information about the first position based on the data of the first image received from the shelf monitoring moving robot 300 and the data of information about the first position.

Also, the processor 21 of the server 200 may match the second image to the information about the second position based on the data of the second image received from the shelf monitoring moving robot 300 and the data of extracted information about the second position.

Also, after the S109 step, the method S100 may further include stitching the first image and the second image adjacent to each other to generate realogram data including display status of products displayed on the first shelf SF1 based on data generated by matching the first image to the information about the first position and matching the second image to the information about the second position.

Referring to FIG. 14, the shelf monitoring method S200 according to another embodiment may comprise moving to a first position closer to a second shelf SF2 than to a first shelf SF1 between the first shelf SF1 and the second shelf SF2 facing each other S201, obtaining a first image of the first shelf SF1 at the first position and obtaining identification information of the first electronic shelf label 105 adjacent to the first position among a plurality of electronic shelf labels 100 provided on the second shelf SF2 S203, moving to the second position closer to the first shelf SF1 than to the second shelf SF2 between the first shelf SF1 and the second shelf SF2 facing each other S205, obtaining a second image of the second shelf SF2 at the second position and obtaining identification information of the second electronic shelf label 106 adjacent to the second position among a plurality of electronic shelf labels 100 provided on the first shelf SF1 S207, and generating first realogram data including display status of products provided on the first shelf SF1 based on the first image and generating second realogram data including display status of products provided on the second shelf SF2 based on the second image S209.

In what follows, the method S200 will be described with reference to FIGS. 16 to 19.

In the S201 step, the processor 21 of the server 200 may control the shelf monitoring moving robot 300 to move to the first position, which is closer to the second shelf SF2 than to the first shelf SF1 between the first shelf SF1 and the second shelf SF2.

In the S203 step, the processor 21 of the server 200 may control the shelf monitoring moving robot 300 to obtain the first image by capturing the first shelf SF1 at the first position adjacent to the second shelf SF2.

At the same time, the processor 21 of the server 200 may control the shelf monitoring moving robot 300 to obtain, at the first position adjacent to the second shelf SF2, identification information of the first electronic shelf label 105 adjacent to the first position among a plurality of electronic shelf labels 100 provided on the second shelf SF2 facing the first shelf SF1.

Also, the processor 21 of the server 200 may obtain information about the first position of the first electronic shelf label 105 based on the identification information of the first electronic shelf label 105.

In the S205 step, the processor 21 of the server 200 may control the shelf monitoring moving robot 300 to move to the second position closer to the first shelf SF1 than to the second shelf SF2 between the first shelf SF1 and the second shelf SF1.

In the S207 step, the processor 21 of the server 200 may control the shelf monitoring moving robot 300 to capture the second shelf SF2 at the second position close to the first shelf SF1 and obtain the second image.

At the same time, the processor 21 of the server 200 may control the shelf monitoring moving robot 300 to obtain, at the first position adjacent to the first shelf SF1, identification information of the second electronic shelf label 106 adjacent to the second position among a plurality of electronic shelf labels 100 provided on the first shelf SF1 facing the second shelf SF2.

Also, the processor 21 of the server 200 may obtain information about the second position of the second electronic shelf label 106 based on the identification information of the second electronic shelf label 106.

In the S209 step, the processor 21 of the server 200 may generate first realogram data including display status of products provided on the first shelf SF1 based on the first image and generate second realogram data including display status of products provided on the second shelf SF2 based on the second image.

Referring to FIG. 15, the S209 step may comprise including product-related information assigned to the second electronic shelf label 106 corresponding to the identification information of the second electronic shelf label 106 in the first realogram data S2091 and including product-related information assigned to the first electronic shelf label 105 corresponding to the identification information of the first electronic shelf label 105 in the second realogram data S2093.

In the S2091 step, the processor 21 of the server 200 may include product-related information assigned to the second electronic shelf label 106 corresponding to the identification information of the second electronic shelf label 106 in the first realogram data based on the first image.

For example, the image of the second electronic shelf label 106 included in the first image may not be correctly identified due to image capture issues such as light blurring. In this case, it may be difficult to generate comprehensive first realogram data including product-related information solely from the first image.

Accordingly, the processor 21 of the server 200 may obtain product-related information assigned to the second electronic shelf label 106 based on the identification information of the second electronic shelf label 106 obtained in advance at the second position adjacent to the first shelf SF1 and include the obtained product-related information in the first realogram data.

In the S2093 step, the processor 21 of the server 200 may include the product-related information assigned to the first electronic shelf label 105 corresponding to the identification information of the first electronic shelf label 105 in the second realogram data based on the second image.

For example, the image of the first electronic shelf label 105 included in the second image may not be correctly identified due to image capture issues such as light blurring. In this case, it may be difficult to generate comprehensive second realogram data including product-related information solely from the second image.

Accordingly, the processor 21 of the server 200 may obtain product-related information assigned to the first electronic shelf label 105 based on the identification information of the first electronic shelf label 105 obtained in advance at the first position adjacent to the second shelf SF2 and include the obtained product-related information in the second realogram data.

Meanwhile, in the S201 step, when the shelf monitoring moving robot 300 is controlled to move to the first position, the shelf monitoring moving robot 300 may be controlled to sequentially move to position 1-1 and position 1-2 closer to the second shelf SF2 than to the first shelf SF1.

In this case, the S203 step may be performed by the shelf monitoring moving robot 300 at the position 1-2.

Here, the position 1-1 and the position 1-2 may be points located on a straight line.

Figure 16:
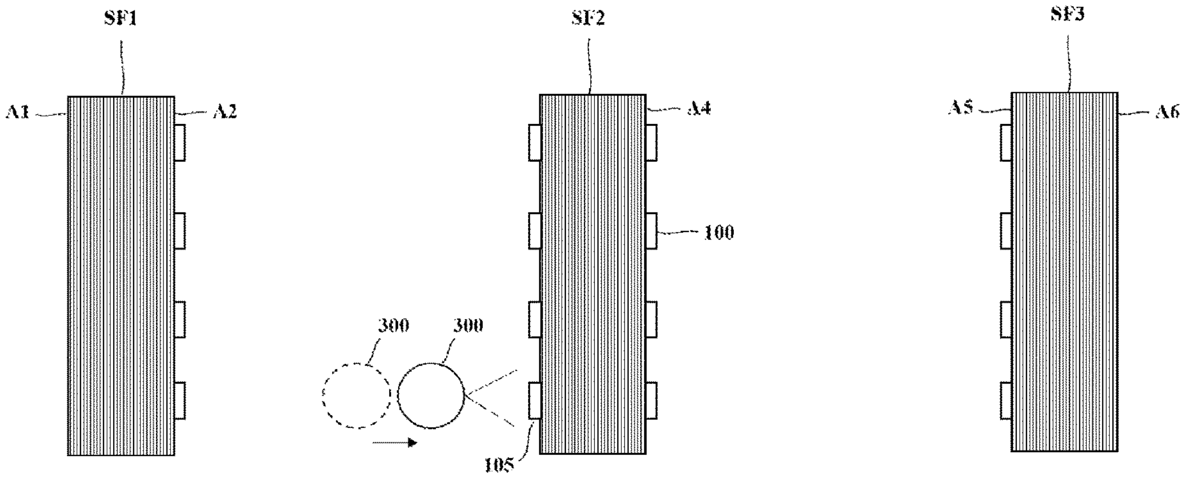
FIGS. 16, 17, 18 and 19 illustrate a method for a shelf monitoring moving robot according to one embodiment to generate realogram data for any one shelf by utilizing identification information of an electronic shelf label provided on the other shelf facing the any one shelf.

For example, referring to FIG. 16, the shelf monitoring moving robot 300 may be controlled to move from a point between the first shelf SF1 and the second shelf SF2 toward the second shelf SF2.

In this case, the shelf monitoring moving robot 300 may first be controlled to move to the position 1-1 separated from the first electronic shelf label 105 provided on the second shelf SF2 by a first threshold distance.

The first threshold distance may be the maximum distance that allows only the first electronic shelf label 105 among a plurality of electronic shelf labels provided on the second shelf SF2 to be included within the field-of-view of the shelf monitoring moving robot 300.

Afterward, the shelf monitoring moving robot 300 may be controlled to obtain, at the position 1-1, a first target image ImT of the first electronic shelf label 105, which is any one of a plurality of electronic shelf labels provided on the second shelf SF2. For example, referring to FIG. 19, the first target image ImT obtained by capturing the second shelf SF2 at the position 1-1 may include the first electronic shelf label 105 and a product adjacent thereto.

Figure 17:
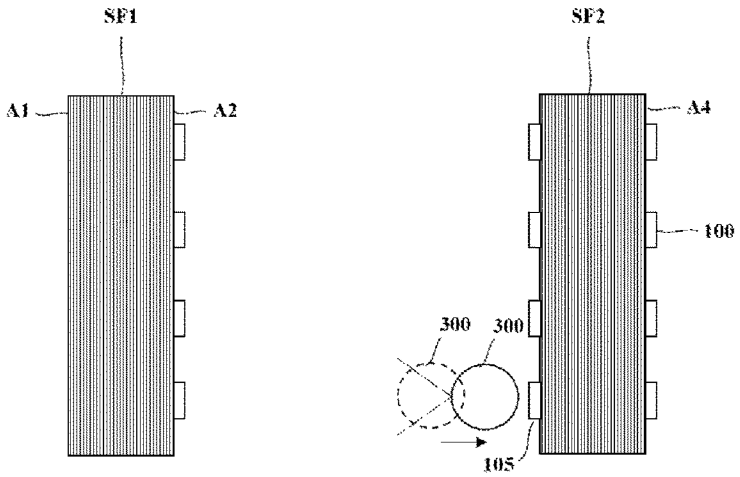

Also, referring to FIG. 17, the shelf monitoring moving robot 300 may be controlled to move to position 1-2 closer to the second shelf SF2 than the position 1-1 and adjacent to the first electronic shelf label 105.

The position 1-2 may be a point separated from the electronic shelf label 105 by a second threshold distance. Here, the second threshold distance may be the maximum distance within which the electronic shelf label identification device of the shelf monitoring moving robot 300 may obtain identification information from the first electronic shelf label 105.

Afterward, referring to FIG. 17, the shelf monitoring moving robot 300 may be controlled to obtain the first image of the first shelf SF1 at the position 1-2. At the same time, the shelf monitoring moving robot 300 may be controlled to obtain the identification information of the first electronic shelf label 105 at the position 1-2.

Further, in the S209 step, the processor 21 of the server 200 may generate the second realogram data including display status of products displayed on the second shelf SF2 based on the second image of the second shelf SF2 at the second position, for which the data of the second image and the data of the first target image ImT may be utilized.

Figure 18:
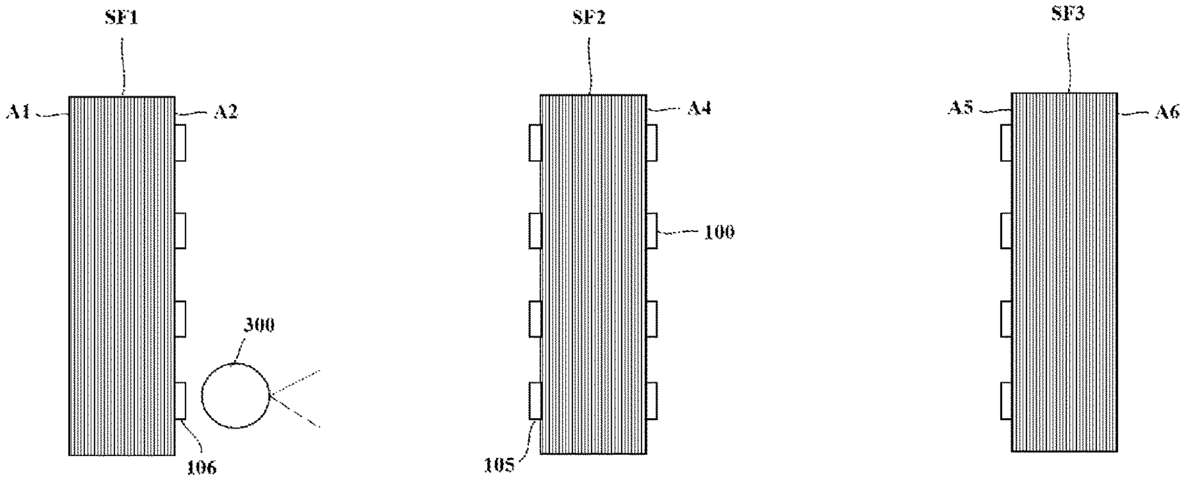

For example, referring to FIG. 18, the shelf monitoring moving robot 300 may be controlled to obtain the second image of the second shelf SF2 at the second position closer to the first shelf SF1 than to the second shelf SF2.

Figure 19:
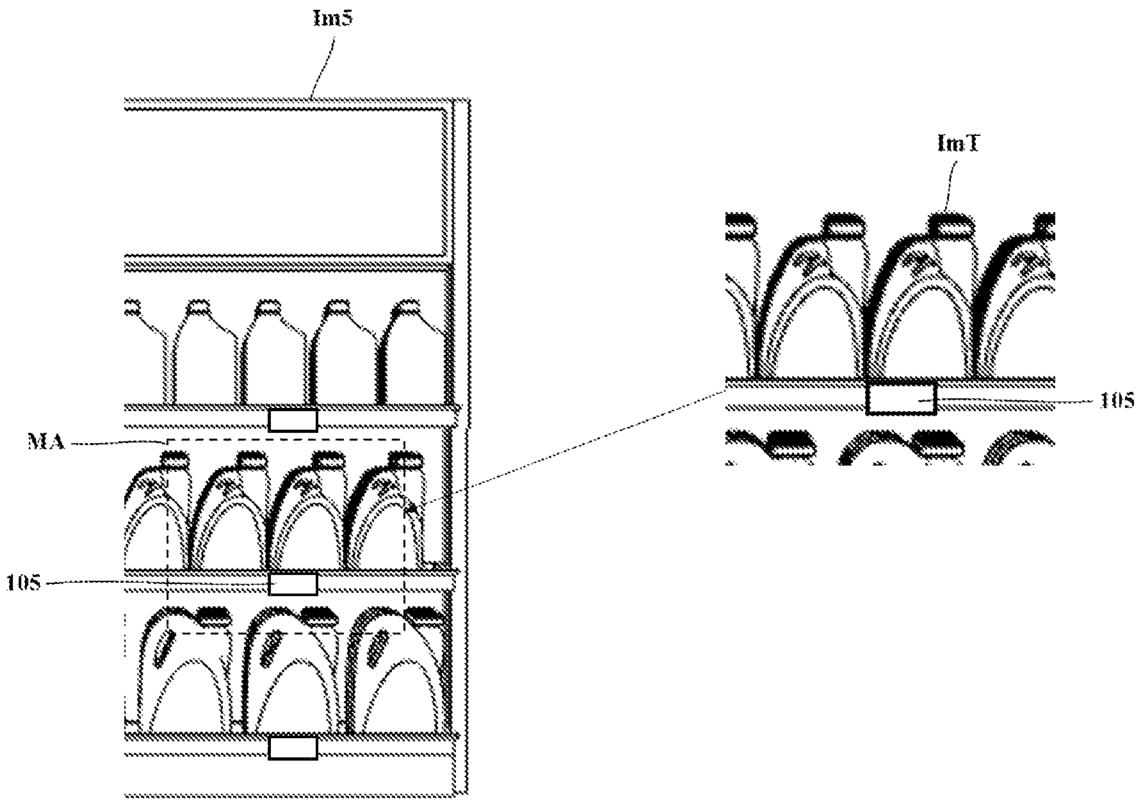

Referring to FIG. 19, the second image Im5 may include a layer providing a first electronic shelf label 105 of the second shelf SF2 and other layers. Also, products and electronic shelf labels may be provided on each of a plurality of layers included in the second image Im5.

The processor 21 of the server 200 may employ an image analysis algorithm to compare and analyze the second image Im5 and the first target image ImT, thereby extracting from the second image Im5 an area MA exhibiting a high similarity to the first target image ImT and identifying the first electronic shelf label 105 from the extracted area MA.

Also, the processor 21 of the server 200 may specify a product adjacent to the first electronic shelf label 105 from the second image Im5. Afterward, the processor 21 of the server 200 may match product-related information assigned to the first electronic shelf label 105 extracted based on the identification information of the first electronic shelf label 105 obtained in advance at the position 1-2 to a product adjacent to the first electronic shelf label 105 specified in the second image Im5.

Accordingly, when it is difficult to identify the first electronic shelf label 105 through image analysis in the second image Im5, product-related information adjacent to the first electronic shelf label 105 identified in the second image Im5 using the identification information of the first electronic shelf label 105 obtained in advance may be included in the second realogram data.

In this way, when generating the first realogram data and the third realogram data for not only the second shelf SF2 but also the first shelf SF1 and the third shelf SF3, the processor 21 of the server 200 may compensate for the first realogram data and the third realogram data using the identification information of the electronic shelf label obtained in advance.

The embodiments of the present disclosure may be implemented in the form of program commands which may be executed through various types of computer means and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; magneto-optical media such as floptical disks; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be configured to be operated by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this document but has to be defined by the appended claims.

What is claimed is:

1. A shelf monitoring moving robot moving within a store in which a plurality of shelves, including a first shelf and a second shelf facing each other, are disposed and monitoring products and electronic shelf labels arranged on the plurality of shelves, the shelf monitoring moving robot comprising:

a body;

a driving module providing power for movement of the body;

an imaging device provided on the body to take images of the plurality of shelves disposed within the store;

an electronic shelf label identification device provided on the body to obtain identification information of electronic shelf labels provided on the plurality of shelves; and a controller controlling the operation of the driving module, the imaging device, and the electronic shelf label identification device and generating realogram data including display status of products provided on the plurality of shelves based on images of the plurality of shelves captured by the imaging device, wherein the controller is configured to: control the driving module to move the body between the first shelf and the second shelf to a first position closer to the second shelf than to the first shelf, control the imaging device to capture a first image of the first shelf at the first position, and obtain information about the first position, and wherein the electronic shelf label identification device includes a wireless communication module that obtains data of identification information of the electronic shelf label through wireless communication with the electronic shelf label provided on the second shelf.

2. The robot of claim 1, wherein the controller is further configured to:

control the driving module to move the body from the first position to a second position separated by a predetermined distance in a direction parallel to the longitudinal direction of the second shelf, control the imaging device to obtain a second image of the first shelf at the second position, and obtain information about the second position.

3. The robot of claim 2, wherein the controller is further configured to match the first image to information about the first position and match the second image to information about the second position.

4. The robot of claim 2, wherein, in obtaining information about the first position and information about the second position, the controller is configured to obtain the information about the first position and the information about the second position by performing wireless communication with an external electronic device.

5. The robot of claim 2, wherein, in obtaining the information about the first position, the controller is configured to control the electronic shelf label identification device to obtain, at the first position, identification information of a first electronic shelf label adjacent to the first position among a plurality of electronic shelf labels provided on the second shelf and obtain, as the information about the first position, position information of the first electronic shelf label based on the identification information of the first electronic shelf label; and in obtaining the information about the second position, the controller is configured to control the electronic shelf label identification device to obtain, at the second position, identification information of a second electronic shelf label adjacent to the second position among a plurality of electronic shelf labels provided on the second shelf and obtain, as the information about the second position, position information of the second electronic shelf label based on the identification information of the second electronic shelf label.

6. The robot of claim 3, wherein the controller is further configured to stitch the first image and the second image adjacent to each other to generate realogram data including display status of products displayed on the first shelf based on data generated by matching the first image with the information about the first position and matching the second image with the information about the second position.

7. The robot of claim 6, wherein, when stitching the first image with the second image, the controller is configured to extract an overlapping area between the first image and the second image using a feature extraction algorithm and stitch the first image with the second image so that the overlapping area is not repeatedly accounted for.

8. The robot of claim 1, further including a distance sensor provided on the body to measure the distance from the body to the second shelf, wherein, in controlling the driving module to move the body to the first position, the controller is configured to control the driving module to move the body to a position within a predetermined threshold distance from the second shelf based on the distance information from the body to the second shelf measured by the distance sensor.

9. The robot of claim 2, further including a distance sensor provided on the body to measure the distance from the body to the first shelf, wherein, in controlling the driving module to move the body to the second position from the first position, the controller is configured to determine the predetermined distance between the first position and the second position based on field-of-view information of the imaging device and the distance information from the body to the first shelf measured by the distance sensor.

10. The robot of claim 1, wherein the electronic shelf label identification device includes an additional imaging device that takes an image of one of the electronic shelf labels provided on the second shelf; and the controller is further configured to identify a pattern code displayed on one of the electronic shelf labels from an image captured by the additional imaging device and obtain data of the identification information of one of the electronic shelf label assigned to the identified pattern code.

11. The robot of claim 1, wherein the controller is further configured to:

control the driving module to move the body between the first shelf and the second shelf to a first position closer to the second shelf than to the first shelf, control the imaging device to capture a first image of the first shelf at the first position, control the electronic shelf label identification device to obtain, at the first position, identification information of a first electronic shelf label adjacent to the first position among a plurality of electronic shelf labels provided on the second shelf, control the driving module to move the body between the first shelf and the second shelf to a second position closer to the first shelf than to the second shelf, control the imaging device to capture a second image of the second shelf at the second position, and control the electronic shelf label identification device to obtain, at the second position, identification information of a second electronic shelf label adjacent to the second position among a plurality of electronic shelf labels provided on the first shelf.

12. The robot of claim 11, wherein the controller is further configured to:

generate first realogram data including display status of products provided on the first shelf based on the first image, and generate second realogram data including display status of products provided on the second shelf based on the second image.

13. The robot of claim 12, wherein, in generating the first realogram data, the controller is configured to include product-related information assigned to the second electronic shelf label corresponding to the identification information of the second electronic shelf label obtained by the electronic shelf label identification device in the first realogram data, and in generating the second realogram data, the controller is configured to include product-related information assigned to the first electronic shelf label corresponding to the identification information of the first electronic shelf label obtained by the electronic shelf label identification device in the second realogram data.

14. The robot of claim 11, wherein the controller is further configured to:

control the driving module to move the body to position 1-1 closer to the second shelf than to the first shelf, control the imaging device to obtain, at the position 1-1, a first target image of the first electronic shelf label, which is one of a plurality of electronic shelf labels provided on the second shelf, control the driving module to move the body to position 1-2 closer to the second shelf than the position 1-1 and adjacent to the first electronic shelf label, control the imaging device to capture the first image of the first shelf at the position 1-2, and control the electronic shelf label identification device to obtain identification information of the first electronic shelf label at the position 1-2.

15. The robot of claim 14, wherein, while generating realogram data including display status of products provided on the second shelf based on the second image, the controller is configured to:

specify the first electronic shelf label from the second image by comparing the second image with a first target image of the first electronic shelf label provided on the second shelf, specify a product adjacent to the first electronic shelf label from the second image, and match product-related information assigned to the first electronic shelf label extracted based on the identification information of the first electronic shelf label to a product adjacent to the first electronic shelf label specified in the second image.

16. A shelf monitoring system comprising:

a shelf monitoring moving robot moving within a store in which a plurality of shelves, including a first shelf and a second shelf facing each other, are disposed and monitoring products and electronic shelf labels provided on the plurality of shelves; and a server including at least one processor performing computations for controlling the operation of the shelf monitoring moving robot and a memory storing commands and programs for controlling the operation of the shelf monitoring moving robot, wherein the at least one processor is configured to:

control the shelf monitoring moving robot to sequentially move between the first shelf and the second shelf through a plurality of positions closer to the second shelf than to the first shelf, control an imaging device of the shelf monitoring moving robot to obtain a plurality of images by taking images of the first shelf sequentially at each of the plurality of positions, obtain information about the plurality of positions by wirelessly communicating, at each of the plurality of positions, with an electronic shelf label provided on the second shelf to obtain identification information of the electronic shelf label by the shelf monitoring moving robot, and match an image of the first shelf obtained at any one position of the plurality of positions to information about the any one position and store the matched information in the memory.

17. A shelf monitoring method for a shelf monitoring moving robot to move within a store in which a plurality of shelves, including a first shelf and a second shelf facing each other, are disposed and monitor products and electronic shelf labels provided on the plurality of shelves, the method comprising:

moving sequentially between the first shelf and the second shelf through a plurality of positions closer to the second shelf than to the first shelf by the shelf monitoring moving robot;

taking images of the first shelf sequentially at each of the plurality of positions by the shelf monitoring moving robot;

obtaining information about the plurality of positions by wirelessly communicating, at each of the plurality of positions, with an electronic shelf label provided on the second shelf to obtain identification information of the electronic shelf label by the shelf monitoring moving robot; and matching an image of the first shelf obtained at any one position among the plurality of positions to information about the any one position.

* * * * *